US010494056B2

(12) United States Patent
Kakinoki et al.

(10) Patent No.: US 10,494,056 B2
(45) Date of Patent: Dec. 3, 2019

(54) BICYCLE DRIVING ASSEMBLY

(71) Applicant: Shimano Inc., Sakai, Osaka (JP)

(72) Inventors: Nobuyuki Kakinoki, Osaka (JP); Kazutaka Niki, Osaka (JP)

(73) Assignee: Shimano Inc., Tokyo (JP)

( * ) Notice: Subject to any disclaimer, the term of this patent is extended or adjusted under 35 U.S.C. 154(b) by 257 days.

(21) Appl. No.: 15/807,905

(22) Filed: Nov. 9, 2017

(65) Prior Publication Data

US 2019/0135376 A1    May 9, 2019

(51) Int. Cl.
*B62M 9/14* (2006.01)
*B62M 9/122* (2010.01)
*B62M 25/08* (2006.01)

(52) U.S. Cl.
CPC .............. *B62M 9/14* (2013.01); *B62M 9/122* (2013.01); *B62M 25/08* (2013.01)

(58) Field of Classification Search
CPC . B62M 9/14; B62M 9/04; B62M 9/10; B62M 11/06; B62M 1/105
USPC ........................................................ 474/77
See application file for complete search history.

(56) References Cited

U.S. PATENT DOCUMENTS

| | | | | |
|---|---|---|---|---|
| 702,948 A * | 6/1902 | Hodgkinson | ............ | B62M 9/10 474/77 |
| 4,713,042 A * | 12/1987 | Imhoff | ...................... | B62M 9/14 474/69 |
| 5,205,794 A * | 4/1993 | Browning | ................ | B62M 9/14 474/160 |
| 5,354,243 A * | 10/1994 | Kriek | ....................... | B62M 9/14 474/135 |
| 7,258,637 B2 * | 8/2007 | Thomasberg | ............ | B62M 9/14 474/160 |
| 7,326,137 B2 * | 2/2008 | van der Linde | ......... | B62M 9/04 474/80 |
| 7,361,109 B2 * | 4/2008 | Kilshaw | ................... | B62M 9/04 280/261 |
| 8,066,596 B1 * | 11/2011 | Kilshaw | ................... | B62M 9/12 474/79 |
| 8,556,757 B2 | 10/2013 | Kilshaw | | |
| 9,499,233 B2 * | 11/2016 | Schuster | ................... | B62M 9/08 |
| 9,725,132 B2 * | 8/2017 | Hara | ........................ | B62M 1/36 |
| 10,259,532 B2 * | 4/2019 | Schuster | ................... | B62M 9/14 |

* cited by examiner

*Primary Examiner* — Henry Y Liu
(74) *Attorney, Agent, or Firm* — Global IP Counselors, LLP

(57) ABSTRACT

A bicycle driving assembly is basically provided with a first sprocket cluster, a second sprocket cluster and a first actuator. The first sprocket cluster includes at least one first sprocket configured to be rotatable about a rotational axis. The second sprocket cluster includes at least one second sprocket configured to be rotatable about the rotational axis. The first actuator is configured to move the first sprocket cluster and the second sprocket cluster relative to one another in an axial direction of the rotational axis.

23 Claims, 17 Drawing Sheets

BICYCLE DRIVING ASSEMBLY

BACKGROUND

Field of the Invention

This invention generally relates to a bicycle driving assembly.

Background Information

Generally, bicycles have a drive train that uses a bicycle chain to transmit the pedaling force to the rear wheel. A bicycle drivetrain typically has a front sprocket assembly having at least one front sprocket provided on a bicycle crank assembly of the bicycle and a rear sprocket assembly having at least one rear sprocket provided on a rear hub assembly of the bicycle. The bicycle chain wraps around the front and rear sprockets. Thus, rotation of the bicycle crank assembly by the rider is transmitted to the rear wheel by the bicycle chain, which meshes with the front and rear sprockets. Some bicycles are provided with a plurality of front sprockets or a single front sprocket. The front sprockets are often attached to a crank arm to form a bicycle front crank assembly. The drive train of the bicycle often uses one or two derailleurs to selectively move the bicycle chain from one sprocket to another for changing speeds of the bicycle.

SUMMARY

Generally, the present disclosure is directed to various features of a bicycle driving assembly. In one feature, a bicycle driving assembly is provided in which a first sprocket cluster and a second sprocket cluster are axially movable relative to one another.

In view of the state of the known technology and in accordance with a first aspect of the present disclosure, a bicycle driving assembly is basically provided with a first sprocket cluster, a second sprocket cluster and a first actuator. The first sprocket cluster includes at least one first sprocket configured to be rotatable about a rotational axis. The second sprocket cluster includes at least one second sprocket configured to be rotatable about the rotational axis. The first actuator is configured to move the first sprocket cluster and the second sprocket cluster relative to one another in an axial direction of the rotational axis.

With the bicycle driving assembly according to the first aspect, it is possible to provide good driving efficiency. Additionally, the bicycle driving assembly according to the first aspect provides low abrasion of the sprocket and chain. Additionally, the bicycle driving assembly according to the first aspect provides good chain holding capability.

In accordance with a second aspect of the present invention, the bicycle driving assembly according to the first aspect is configured so that the first sprocket cluster is configured to be axially moved by the first actuator in a mounted state where the bicycle driving assembly is mounted to a bicycle and the second sprocket cluster is configured to be non-movably fixed in the axial direction in the mounted state.

With the bicycle driving assembly according to the second aspect, it is possible to provide good driving efficiency. Additionally, the bicycle driving assembly according to the second aspect provides low abrasion of the sprocket and chain. Additionally, the bicycle driving assembly according to the second aspect provides good chain holding capability.

In accordance with a third aspect of the present invention, the bicycle driving assembly according to the first aspect is configured so that the second sprocket cluster is configured to be axially moved by the first actuator in a mounted state where the bicycle driving assembly is mounted to a bicycle and the first sprocket cluster is configured to be non-movably fixed in the axial direction in the mounted state.

With the bicycle driving assembly according to the third aspect, it is possible to provide good driving efficiency. Additionally, the bicycle driving assembly according to the third aspect provides low abrasion of the sprocket and chain. Additionally, the bicycle driving assembly according to the third aspect provides good chain holding capability.

In accordance with a fourth aspect of the present invention, the bicycle driving assembly according to any of the first to third aspects is configured so that the second sprocket cluster is at least partially located outward of the first sprocket cluster in a mounted state where the bicycle driving assembly is mounted to a bicycle.

With the bicycle driving assembly according to the fourth aspect, it is possible to provide good driving efficiency. Additionally, the bicycle driving assembly according to the fourth aspect provides low abrasion of the sprocket and chain. Additionally, the bicycle driving assembly according to the fourth aspect provides good chain holding capability.

In accordance with a fifth aspect of the present invention, the bicycle driving assembly according to any one of the first to fourth aspects is configured so that the at least one first sprocket includes a plurality of the first sprockets.

With the bicycle driving assembly according to the fifth aspect, it is possible to provide good driving efficiency. Additionally, the bicycle driving assembly according to the fifth aspect provides low abrasion of the sprocket and chain. Additionally, the bicycle driving assembly according to the fifth aspect provides good chain holding capability.

In accordance with a sixth aspect of the present invention, the bicycle driving assembly according to any one of the first to fifth aspects is configured so that the at least one second sprocket includes a plurality of the second sprockets.

With the bicycle driving assembly according to the sixth aspect, it is possible to provide good driving efficiency. Additionally, the bicycle driving assembly according to the sixth aspect provides low abrasion of the sprocket and chain. Additionally, the bicycle driving assembly according to the sixth aspect provides good chain holding capability.

In accordance with a seventh aspect of the present invention, the bicycle driving assembly according to any one of the first to sixth aspects is configured so that the at least one first sprocket has a total tooth number that is greater than a total tooth number of the at least one second sprocket.

With the bicycle driving assembly according to the seventh aspect, it is possible to provide good driving efficiency. Additionally, the bicycle driving assembly according to the seventh aspect provides low abrasion of the sprocket and chain. Additionally, the bicycle driving assembly according to the seventh aspect provides good chain holding capability.

In accordance with an eighth aspect of the present invention, the bicycle driving assembly according to any one of the first to seventh aspects is configured so that one of the first sprocket cluster and the second sprocket cluster is movably disposed relative to the other of the first sprocket cluster and the second sprocket cluster between a non-overlapping position and an overlapping position. The at least one second sprocket does not overlap with the first sprocket cluster in a radial direction that is perpendicular to the rotational axis while in the non-overlapping position.

The at least one second sprocket overlaps with the first sprocket cluster in the radial direction while in the overlapping position.

With the bicycle driving assembly according to the eighth aspect, it is possible to provide good driving efficiency. Additionally, the bicycle driving assembly according to the eighth aspect provides low abrasion of the sprocket and chain. Additionally, the bicycle driving assembly according to the eighth aspect provides good chain holding capability.

In accordance with a ninth aspect of the present invention, the bicycle driving assembly according to the eighth aspect is configured so that the at least one first sprocket includes a first largest sprocket and a first smallest sprocket, and the at least one second sprocket includes a second largest sprocket and a second smallest sprocket. The first largest sprocket is positioned closer to a bicycle frame of a bicycle than the first smallest sprocket in a mounted state where the bicycle driving assembly is mounted to the bicycle. The second smallest sprocket is positioned closer to the bicycle frame of the bicycle than the second largest sprocket in the mounted state. The first smallest sprocket is positioned closer to the bicycle frame of the bicycle than the second smallest sprocket in a state where the bicycle driving assembly is mounted to the bicycle and the one of the first sprocket cluster and the second sprocket cluster is positioned in the non-overlapping position.

With the bicycle driving assembly according to the ninth aspect, it is possible to provide good driving efficiency. Additionally, the bicycle driving assembly according to the ninth aspect provides low abrasion of the sprocket and chain. Additionally, the bicycle driving assembly according to the ninth aspect provides good chain holding capability.

In accordance with a tenth aspect of the present invention, the bicycle driving assembly according to any one of the first to seventh aspects is configured so that one of the first sprocket cluster and the second sprocket cluster is movably disposed relative to the other of the first sprocket cluster and the second sprocket cluster between a non-overlapping position and an overlapping position. The first sprocket cluster defines a second sprocket cluster receiving area. The at least one second sprocket is spaced from the second sprocket cluster receiving area while in the non-overlapping position. The at least one second sprocket is disposed inside the second sprocket cluster receiving area while in the overlapping position.

With the bicycle driving assembly according to the tenth aspect, it is possible to provide good driving efficiency. Additionally, the bicycle driving assembly according to the tenth aspect provides low abrasion of the sprocket and chain. Additionally, the bicycle driving assembly according to the tenth aspect provides good chain holding capability.

In accordance with an eleventh aspect of the present invention, the bicycle driving assembly according to the tenth aspect is configured so that the at least one first sprocket includes a first largest sprocket and a first smallest sprocket, and the at least one second sprocket includes a second largest sprocket and a second smallest sprocket. The first largest sprocket is positioned closer to a bicycle frame of a bicycle than the first smallest sprocket in a mounted state where the bicycle driving assembly is mounted to the bicycle. The second smallest sprocket is positioned closer to the bicycle frame of the bicycle than the second largest sprocket in the mounted state. The first smallest sprocket is positioned closer to the bicycle frame of the bicycle than the second smallest sprocket in a state where the bicycle driving assembly is mounted to the bicycle and the one of the first sprocket cluster and the second sprocket cluster is positioned in the non-overlapping position.

With the bicycle driving assembly according to the eleventh aspect, it is possible to provide good driving efficiency. Additionally, the bicycle driving assembly according to the eleventh aspect provides low abrasion of the sprocket and chain. Additionally, the bicycle driving assembly according to the eleventh aspect provides good chain holding capability.

In accordance with a twelfth aspect of the present invention, the bicycle driving assembly according to any of the first to eleventh aspects is configured so that the first actuator includes a motor having an output shaft operatively coupled to one of the first sprocket cluster and the second sprocket cluster that is movably disposed relative to the other of the first sprocket cluster and the second sprocket cluster.

With the bicycle driving assembly according to the twelfth aspect, it is possible to provide good driving efficiency. Additionally, the bicycle driving assembly according to the twelfth aspect provides low abrasion of the sprocket and chain. Additionally, the bicycle driving assembly according to the twelfth aspect provides good chain holding capability.

In accordance with a thirteenth aspect of the present invention, the bicycle driving assembly according to the twelfth aspect is configured so that a hub axle is attached to a bicycle frame of a bicycle. The hub axle supports at least the motor of the first actuator being disposed coaxially around the hub axle.

With the bicycle driving assembly according to the thirteenth aspect, it is possible to provide good driving efficiency. Additionally, the bicycle driving assembly according to the thirteenth aspect provides low abrasion of the sprocket and chain. Additionally, the bicycle driving assembly according to the thirteenth aspect provides good chain holding capability.

In accordance with a fourteenth aspect of the present invention, the bicycle driving assembly according to the twelfth aspect is configured so that the output shaft has a first thread that is engaged with a second thread of the one of the first sprocket cluster and the second sprocket cluster so that the one of the first sprocket cluster and the second sprocket cluster axially moves by a rotation of the output shaft.

With the bicycle driving assembly according to the fourteenth aspect, it is possible to provide good driving efficiency. Additionally, the bicycle driving assembly according to the fourteenth aspect provides low abrasion of the sprocket and chain. Additionally, the bicycle driving assembly according to the fourteenth aspect provides good chain holding capability.

In accordance with a fifteenth aspect of the present invention, the bicycle driving assembly according to the fourteenth aspect is configured so that the second thread is provided on the first sprocket cluster.

With the bicycle driving assembly according to the fifteenth aspect, it is possible to provide good driving efficiency. Additionally, the bicycle driving assembly according to the fifteenth aspect provides low abrasion of the sprocket and chain. Additionally, the bicycle driving assembly according to the fifteenth aspect provides good chain holding capability.

In accordance with a sixteenth aspect of the present invention, the bicycle driving assembly according to the fourteenth aspect is configured so that the second thread is provided on the second sprocket cluster.

With the bicycle driving assembly according to the sixteenth aspect, it is possible to provide good driving efficiency. Additionally, the bicycle driving assembly according to the sixteenth aspect provides low abrasion of the sprocket and chain. Additionally, the bicycle driving assembly according to the sixteenth aspect provides good chain holding capability.

In accordance with a seventeenth aspect of the present invention, the bicycle driving assembly according to any one of the first to sixteenth aspects is configured so that a first controller is connected to the first actuator.

With the bicycle driving assembly according to the sixteenth aspect, it is possible to provide good driving efficiency. Additionally, the bicycle driving assembly according to the seventeenth aspect provides low abrasion of the sprocket and chain. Additionally, the bicycle driving assembly according to the seventeenth aspect provides good chain holding capability.

In accordance with an eighteenth aspect of the present invention, the bicycle driving assembly according to any one of the first to seventeenth aspects is configured so that a first power source electrically coupled to the first actuator.

With the bicycle driving assembly according to the eighteenth aspect, it is possible to provide good driving efficiency. Additionally, the bicycle driving assembly according to the eighteenth aspect provides low abrasion of the sprocket and chain. Additionally, the bicycle driving assembly according to the eighteenth aspect provides good chain holding capability.

In accordance with a nineteenth aspect of the present invention, the bicycle driving assembly according to the seventeenth aspect is configured so that a first wireless communicator is connected to the first controller.

With the bicycle driving assembly according to the nineteenth aspect, it is possible to provide good driving efficiency. Additionally, the bicycle driving assembly according to the nineteenth aspect provides low abrasion of the sprocket and chain. Additionally, the bicycle driving assembly according to the nineteenth aspect provides good chain holding capability.

In accordance with a twentieth aspect of the present invention, a bicycle shifting system includes the bicycle driving assembly according to any one of the first to nineteenth aspects and a chain guide configured to guide a bicycle chain movably coupled to the bicycle driving assembly.

With the bicycle shifting system according to the twentieth aspect, it is possible to provide good driving efficiency. Additionally, the bicycle shifting system assembly according to the twentieth aspect provides low abrasion of the sprocket and chain. Additionally, the bicycle driving assembly according to the twentieth aspect provides good chain holding capability.

In accordance with a twenty-first aspect of the present invention, the bicycle shifting system according to the twentieth aspect is configured so a bicycle rear derailleur includes the chain guide.

With the bicycle shifting system according to the twenty-first aspect, it is possible to provide good driving efficiency. Additionally, the bicycle shifting system according to the twenty-first aspect provides with low abrasion of the sprocket and chain. Additionally, the bicycle shifting system according to the twenty-first aspect provides good chain holding capability.

In accordance with a twenty-second aspect of the present invention, the bicycle shifting system according to the twenty-first aspect is configured so that a shift position detector is configured to detect a shift position of the bicycle rear derailleur and a main controller is configured to control the first actuator based on the shift position of the bicycle rear derailleur detected by the shift position detector.

With the bicycle shifting system according to the twenty-second aspect, it is possible to provide good driving efficiency. Additionally, the bicycle shifting system according to the twenty-second aspect provides low abrasion of the sprocket and chain. Additionally, the bicycle shifting system according to the twenty-second aspect provides good chain holding capability.

In accordance with a twenty-third aspect of the present invention, the bicycle shifting system according to the twenty-first or twenty-second aspect is configured so that the bicycle shifting system includes a second actuator configured to move the chain guide and a main controller configured to control the first actuator and the second actuator.

With the bicycle shifting system according to the twenty-third aspect, it is possible to provide good driving efficiency. Additionally, the bicycle shifting system according to the twenty-third aspect provides low abrasion of the sprocket and chain. Additionally, the bicycle shifting system according to the twenty-third aspect provides good chain holding capability.

Also, other objects, features, aspects and advantages of the disclosed bicycle driving assembly will become apparent to those skilled in the art from the following detailed description, which, taken in conjunction with the annexed drawings, discloses several embodiments of the bicycle driving assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Figure 1:
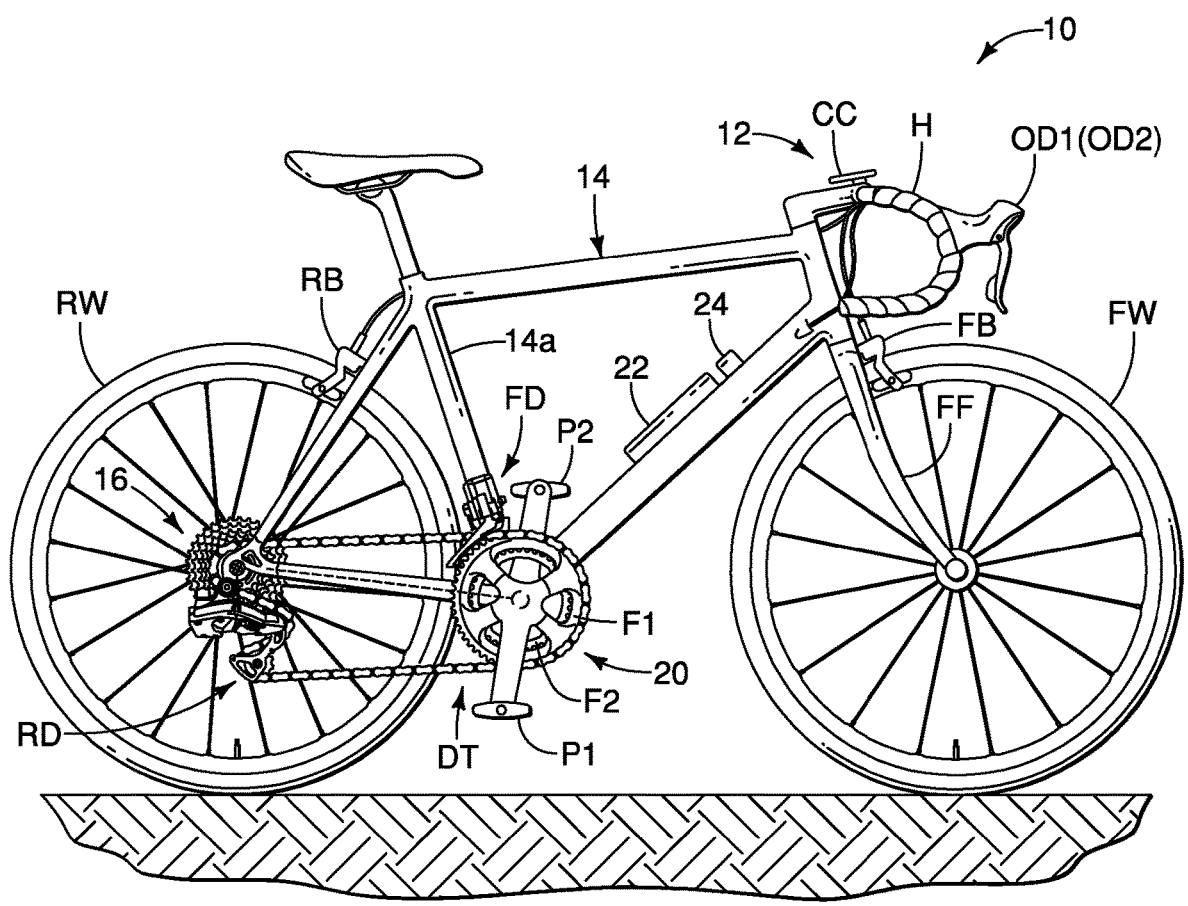
FIG. 1 is a side elevational view of a bicycle including a bicycle driving assembly in accordance with an illustrated exemplary embodiment.

Referring initially to FIG. 1, a bicycle 10 is illustrated in accordance with an exemplary embodiment. The bicycle 10 has an electrically powered bicycle control system 12 (FIG. 2) that includes first and second operating devices OD1 and OD2, respectively, operable to electrically control bicycle components as described in greater detail below.

The bicycle 10 includes, among other things, a bicycle body 14, a handlebar H, a front wheel FW, a rear wheel RW, a front brake FB and a rear brake RB. The first and second operating devices OD1 and OD2 are mounted at opposite ends of the handlebar H. The bicycle body 14 includes a bicycle frame 14a and a front fork FF. The front wheel FW is mounted in a conventional manner to the front fork FF. The rear wheel RW is rotatably coupled to a rear portion of the bicycle frame 14a via a rear bicycle hub assembly 16a (FIG. 9) in a conventional manner.

A drive train DT is provided on the bicycle frame 14a to propel the bicycle 10. The drive train DT basically includes a bicycle driving assembly 16, a pair of pedals P1 and P2, a front sprocket assembly 20 mounted to rotate with the pedals P1 and P2, and a chain C extending between the bicycle driving assembly 16 and the front sprocket assembly 20. The pedals P1 and P2 are coupled to the front sprocket assembly 20 by a conventional crank set to transfer force from the rider to the chain C. The force from the chain C is selectively transferred to the rear wheel RW via the bicycle driving assembly 16.

Figure 11:
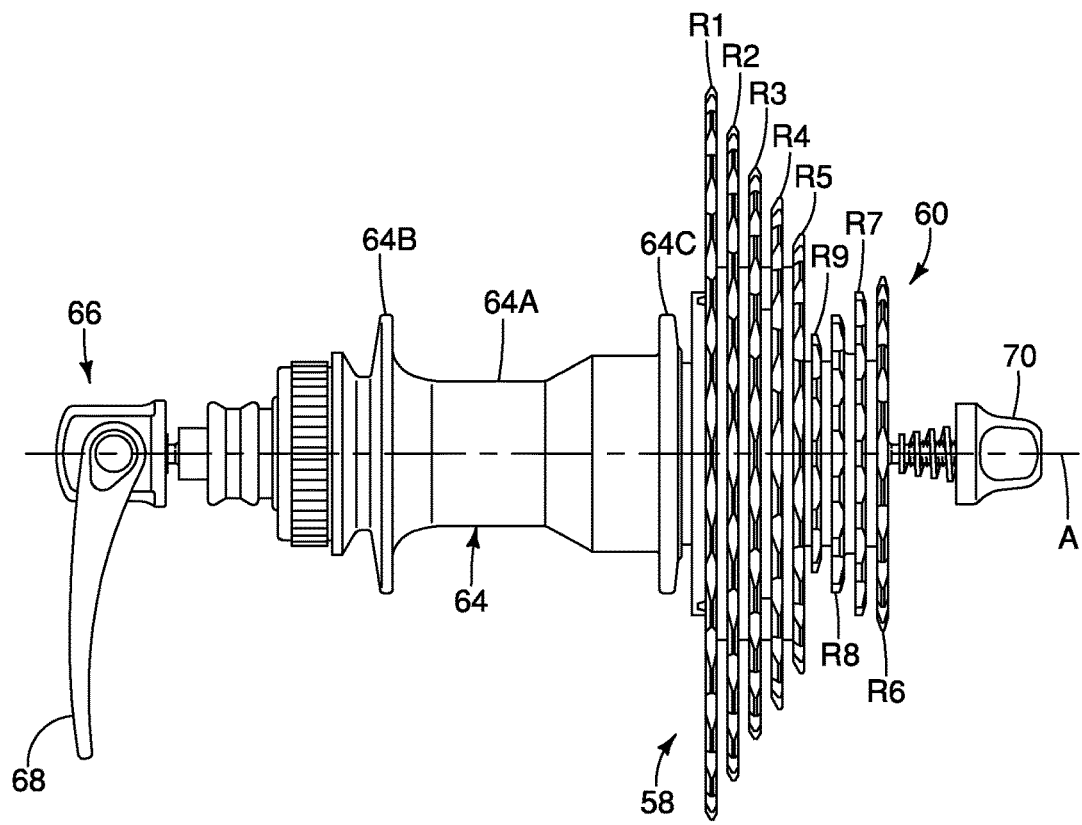
FIG. 11 is a side elevational view of the bicycle driving assembly of FIG. 9.

The bicycle driving assembly 16 includes a plurality of sprockets R1 through R9, which are described in greater detail below, mounted to the bicycle frame 14a as shown in FIGS. 1 and 11. The front sprocket assembly 20, as shown in FIG. 1, is rotatably supported to a lower portion of the bicycle frame 14a in a conventional manner, and includes a set of front sprockets F1 and F2 mounted to the crank axle in a conventional manner. The chain C is operatively coupled between the rear sprockets R1 to R9, and the front sprockets F1 and F2, in a conventional manner.

The front brake FB is mounted to the front fork FF adjacent to the front wheel FW in a conventional manner. The rear brake RB is mounted to the rear portion of the bicycle frame 14a adjacent to the rear wheel RW in a conventional manner. The front wheel FW, the rear wheel RW, the front brake FB and the rear brake RB are all conventional elements, such that no further description is provided for the sake of brevity.

The bicycle 10 also includes a front derailleur FD and a rear derailleur RD that are described in greater detail below. The front derailleur FD is attached to the bicycle frame 14a in a conventional manner adjacent to the front sprocket assembly 20. The front derailleur FD is configured to move the chain C between the front sprockets F1 and F2 of the front sprocket assembly 20 in a conventional manner as controlled by the second operating device OD2 of the bicycle control system. The rear derailleur RD is attached to the bicycle frame 14a in a conventional manner. The rear derailleur RD is configured to move the chain C between the various diameter chain sprockets R1 through R9 of the bicycle driving assembly 16 as controlled by the first operating device OD1 of the bicycle control system 12.

In this illustrated embodiment, the bicycle control system 12 further includes a cycle computer, or control unit, CC mounted to the handlebar H in a conventional manner via a bicycle attachment portion. The cycle computer CC includes a central processing unit (CPU) (not shown), conventional electronic memory, such as RAM, ROM and/or FLASH memory, a display D, and a battery (not shown) that powers the cycle computer CC. In the illustrated embodiment, the cycle computer CC includes a wireless signal receiver, which can receive information from wireless controllers of the first and second operating devices OD1 and OD2. Alternatively, the cycle computer CC can be electrically coupled to controllers of the operating devices OD1 and OD2 via wires or other suitable connections.

Figure 2:
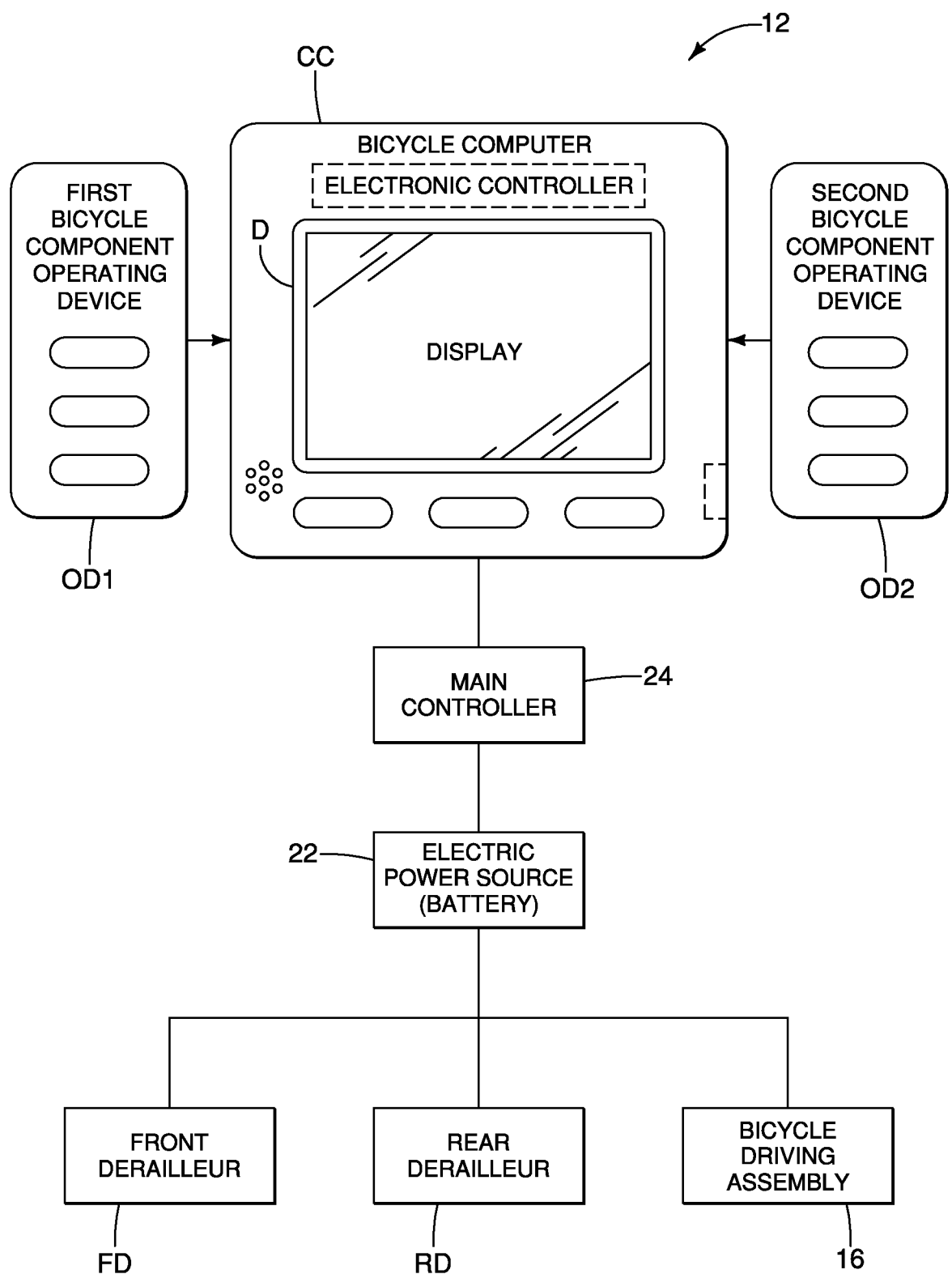
FIG. 2 is a schematic block diagram of a control system for controlling electrical bicycle components of FIG. 1.

As shown in FIG. 2, the cycle computer CC is provided with an electric power source 22, such as, but not limited to, a battery, for supplying electrical power to a main controller 24 and the electrical bicycle components. In other words, the electric power source 22 constitutes an electrical energy storage device or storage element that serves as a power source for the electrical components of the bicycle 10. The electric power source 22 is not limited to a battery as the power supply. Rather, for example, a generator by itself or a generator in conjunction with a battery can be used for the electric power source of the cycle computer CC, the main controller 24 and the electrical bicycle components. The cycle computer CC further includes an integrated display D.

As explained below in more detail, the main controller 24 is configured to selectively change various setting states of the electrical bicycle components in response to a manual input from a rider or an automatic input from a control program in the main controller 24. In other words, the main controller 24 is configured to selectively change at least one electrically adjustable parameter of the electrical bicycle components.

Referring to FIG. 2, the bicycle component control system 12 is configured to selectively control at least the front derailleur FD, the rear derailleur RD and the bicycle driving assembly 16. The first and second operating devices OD1 and OD2 are each operatively coupled to the main controller 24. Each of the operating devices OD1 and OD2 selectively outputs an input signal to the main controller 24 to change a setting of the electrical bicycle components in accordance with a control parameter that is outputted by the main controller 24, as discussed below. Although the main controller is shown separated from the rear derailleur, the main controller can be integrated with the rear derailleur. The term "signal" as used herein is not limited to an electrical signal, but includes other types of signals, such as a command.

Figure 3:
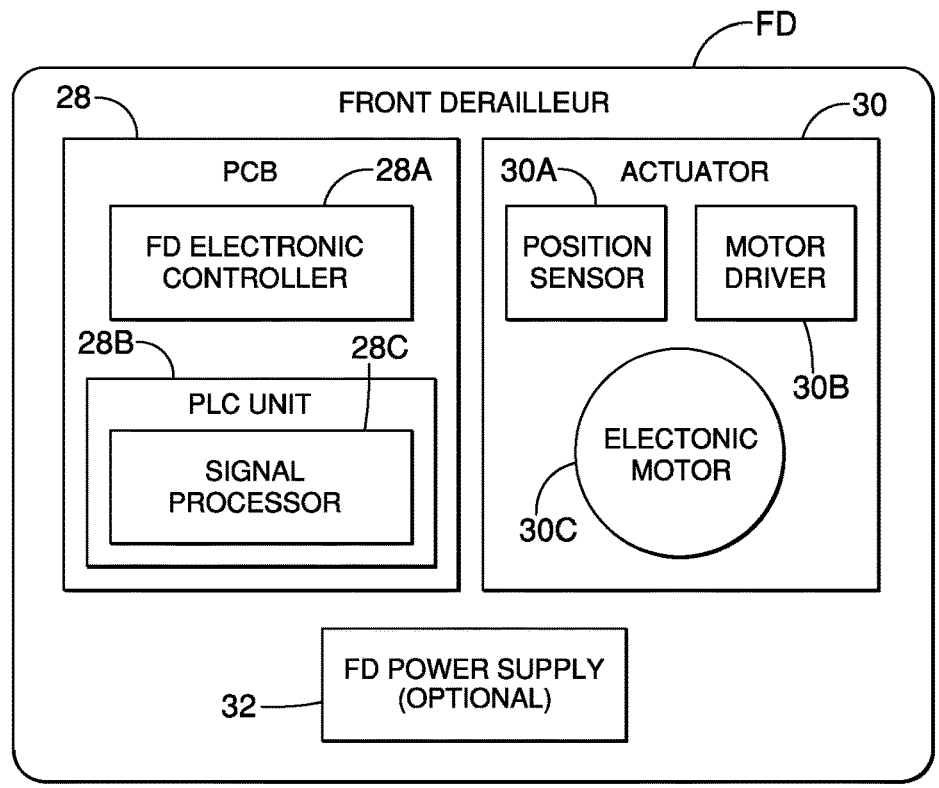
FIG. 3 is a schematic block diagram of a front derailleur of the bicycle of FIG. 1.

In the illustrated embodiment of FIGS. 2 and 3, the front derailleur FD is an electrically operated device that laterally shifts the chain C (FIG. 1) between the front sprockets F1 and F2. Because numerous types of conventional front derailleurs can be utilized for the front derailleur FD, the structure of the front derailleur FD will not be discussed and/or illustrated in detail. The front derailleur FD is manually operated by the second operating device OD2 for controlling a state (that is, a shift position) of the front derailleur FD. The front derailleur FD is basically provided with printed circuit board (PCB) 28 and an actuator 30. The PCB includes a front derailleur electronic controller 28A and a power line communication (PLC) unit 28B, which includes a signal processor 28C.

The power line communication unit 28B is connected to the electric power source 22 for receiving electric power. The printed circuit board 28 includes the front derailleur electronic controller 28A, which includes software that outputs predetermined control parameters in accordance with adjustment signals outputted from the main controller 24. The front derailleur FD further includes the actuator 30, which includes a position sensor 30A, a motor driver 30B and an electronic motor 30C. The electronic motor 30C is a reversible motor that is configured and arranged to drive the front derailleur FD. The motor driver 30B drives the electronic motor 30C in response to control signals from the front derailleur electronic controller 28A. The position sensor 30A detects the position of the actuator 30 or other part, for example, a chain guide (not shown), of the front derailleur that is indicative of its current setting position or state. The front derailleur electronic controller 28A is configured and arranged to control the motor driver 30B in response to an adjustment signal from the second operating device OD2 via the main controller 24. The front derailleur FD can further include a power supply 32 configured to power the components of the front derailleur FD shown in FIG. 3.

Figure 4:
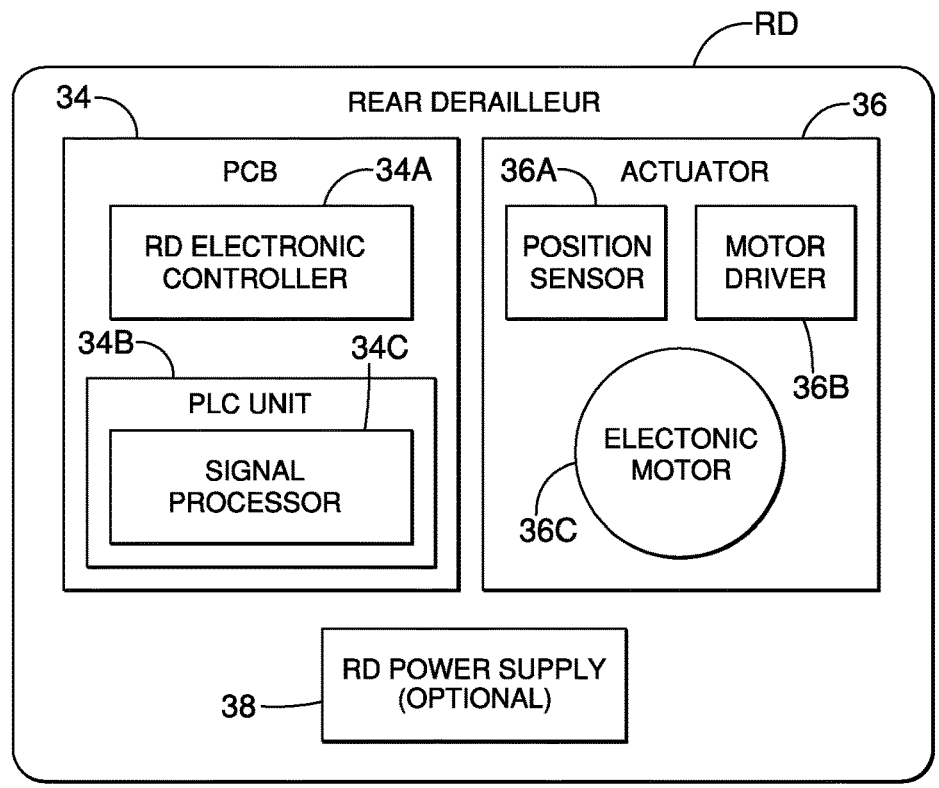
FIG. 4 is a schematic block diagram of a rear derailleur of the bicycle of FIG. 1.

In the illustrated embodiment of FIGS. 2 and 4, the rear derailleur RD is an electrically operated device that laterally shifts the chain C (FIG. 1) between the rear sprockets R1 to R9. Because numerous types of conventional rear derailleurs can be utilized for the rear derailleur RD, the structure of the rear derailleur RD will not be discussed and/or illustrated in detail. The rear derailleur RD is manually operated by the first operating device OD1 for controlling a state (that is, a shift position) of the rear derailleur RD. The rear derailleur RD is basically provided with a printed circuit board (PCB) 34 and a (second) actuator 36. The PCB 34 includes a rear derailleur electronic controller 34A and a power line communication (PLC) unit 34B, which includes a signal processor 34C.

The power line communication unit 34B is connected to the electric power source 22 for receiving electric power. The printed circuit board 34 includes the rear derailleur electronic controller 34A, which includes software that outputs predetermined control parameters in accordance with adjustment signals outputted from the main controller 24. The rear derailleur RD further includes the actuator 36, which includes a position sensor 36A, a motor driver 36B and an electronic motor 36C. The electronic motor 36C is a reversible motor that is configured and arranged to drive the rear derailleur RD. The motor driver 36B drives the electronic motor 36C in response to control signals from the rear derailleur electronic controller 34A. The position sensor 36A detects the position of the actuator 36 or other part, for example, a chain guide 52 (FIG. 7) of the rear derailleur that is indicative of its current setting position or state. The rear derailleur electronic controller 34A is configured and arranged to control the motor driver 36B in response to an adjustment signal from the first operating device OD1 via the main controller 24. The rear derailleur RD can further include a power supply 38 configured to power the components of the rear derailleur RD shown in FIG. 4.

The rear derailleur RD illustrated in FIGS. 2 and 4 is an electric rear derailleur. The shift position detector 30A can be integrated with rear derailleur RD as shown in FIG. 4. Alternatively, the shift position detector 30A can be integrated with one of the operating devices OD1 and OD2. Alternatively, the rear derailleur can be a mechanical type rear derailleur in which the shift position detector is integrated with one of the operating devices OD1 and OD2.

Figure 5:
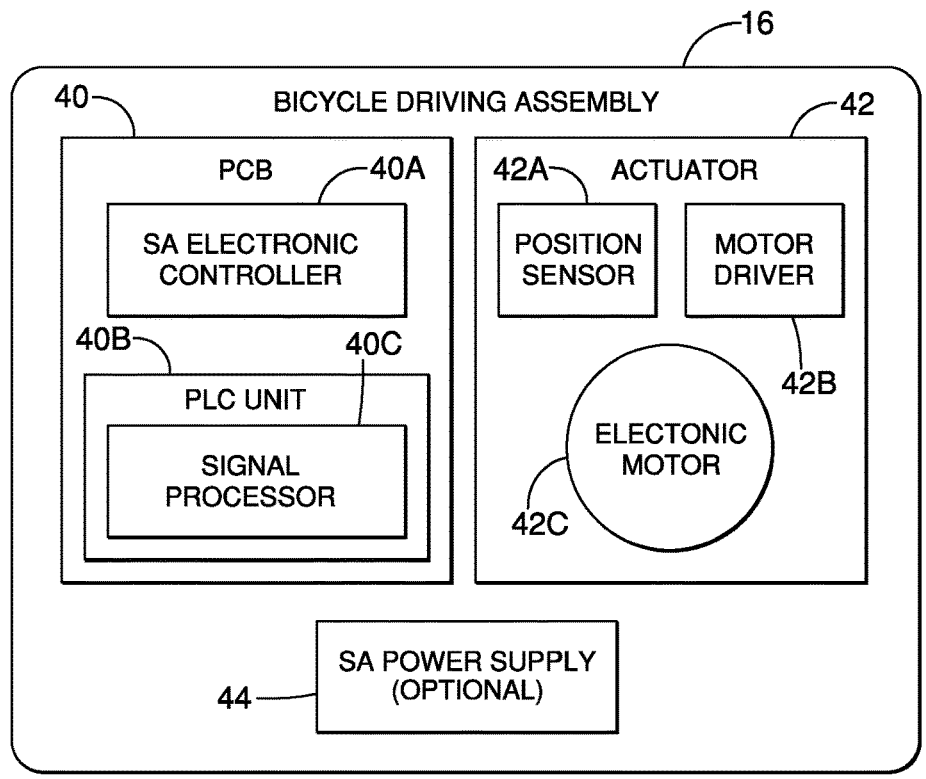
FIG. 5 is a schematic block diagram of a wired configuration of a bicycle driving assembly of the bicycle of FIG. 1.
Figure 7:
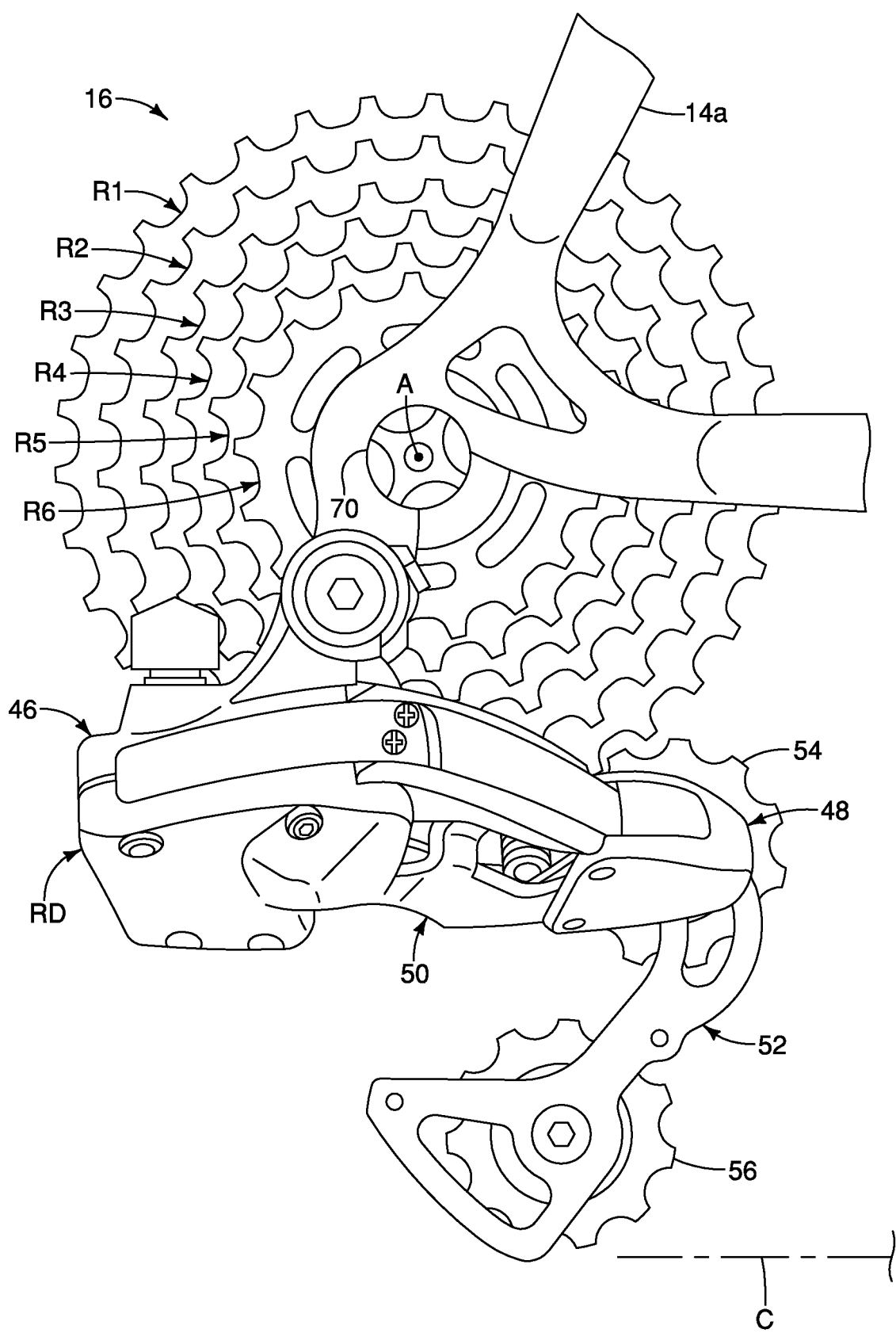
FIG. 7 is an enlarged side elevational view of the rear derailleur of the bicycle illustrated in FIG. 1.
Figure 8:
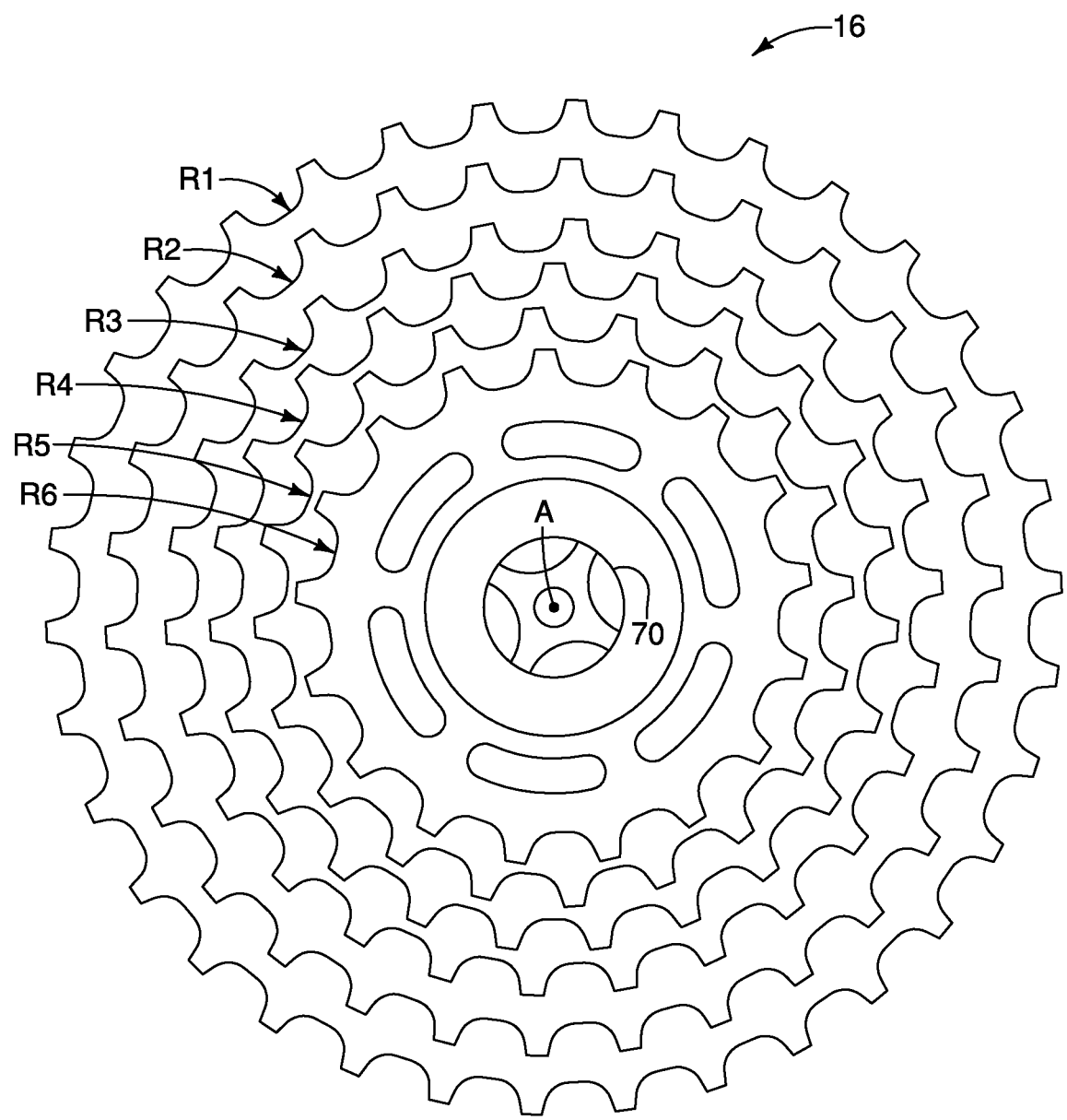
FIG. 8 is an enlarged side elevational view of the bicycle driving assembly of FIG. 7 with the rear derailleur removed for clarity.

In the illustrated embodiment of FIGS. 2 and 5, the bicycle driving assembly 16 is an electrically operated device to move a sprocket cluster in an axial direction of a rotational axis A (FIG. 7). The bicycle driving assembly 16 is manually operated by the first and/or second operating devices OD1 and OD2 for controlling a state, (that is, a shift position) of the bicycle driving assembly 16. A wired configuration of the bicycle driving assembly 16 is shown in FIG. 5. The bicycle driving assembly 16 is basically provided with a printed circuit board (PCB) 40 and a (first) actuator 42. The PCB 40 includes a driving assembly electronic controller 40A and a power line communication (PLC) unit 40B, which includes a signal processor 40C.

The power line communication unit 40B is connected to the electric power source 22 for receiving electric power. The printed circuit board 40 includes the driving assembly electronic controller 40A, which includes software that outputs predetermined control parameters in accordance with adjustment signals outputted from the main controller 24. The bicycle driving assembly 16 further includes the actuator 42, which includes a position sensor, or detector, 42A, a motor driver 42B and an electronic motor 42C. The electronic motor 42C is a reversible motor that is configured and arranged to drive the bicycle driving assembly 16. The motor driver 42B drives the electronic motor 42C in response to control signals from the driving assembly electronic controller 40A. The position detector, 42A is configured to detect the shift position of the bicycle rear derailleur RD or other part of the bicycle driving assembly 16 that is indicative of its current setting position or state. The driving assembly electronic, or first, controller 40A is connected to the first actuator 42. The driving assembly electronic controller 40A is configured and arranged to control the motor driver 42B in response to an adjustment signal from the first and/or second operating device OD1 and OD2 via the main controller 24. In other words, the main controller 24 is configured to control the first actuator 42 based on the shift position of the bicycle rear derailleur RD detected by the shift position detector 42A. The electric, or first, power source 22 is electrically coupled to the first actuator 42, as shown in FIGS. 2 and 5. The bicycle driving assembly 16 can further include a power supply 44 configured to power the components of the bicycle driving assembly 26 shown in FIG. 5.

Figure 6:
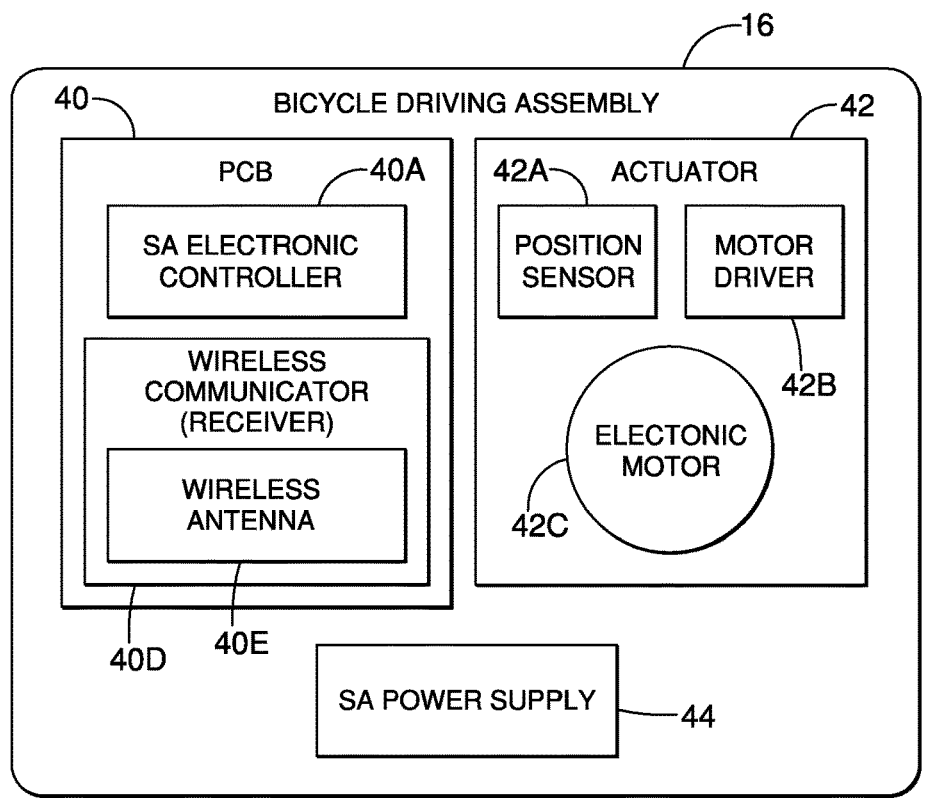
FIG. 6 is a schematic block diagram of a wireless configuration of a bicycle driving assembly of the bicycle of FIG. 1.

Alternatively, FIG. 6 illustrates a wireless configuration of the bicycle driving assembly 16. In the wireless configuration, the PCB 40 includes a wireless communicator, or receiver, 40D configured to receive an adjustment signal from the first and/or second operating device OD1 and OD2 via the main controller 24. The wireless communicator 40D includes a wireless antenna 40E that receives the wireless adjustment signal from the main controller 24. The first wireless communicator is connected to the driving assembly electronic, or first, controller 40A. The bicycle driving assembly 16 further includes the power supply 44 to power the components of the bicycle driving assembly 16 in the wireless configuration shown in FIG. 6.

Referring to FIGS. 1 and 7, a rear portion of the bicycle frame 14a is equipped with the bicycle rear derailleur RD and the bicycle driving assembly 16. The bicycle rear derailleur RD includes a base member 46, a movable member 48, a linkage assembly 50 and a chain guide 52. The movable member 48, the linkage assembly 50 and the chain guide 52 are configured to move relative to the base member 46 to shift the bicycle chain C between the rear sprockets R1 to R9. The bicycle rear derailleur RD includes the second actuator 36 (FIG. 4) configured to move the chain guide 52. The chain guide 52 further includes a guide pulley 54 and a tension pulley 56. A bicycle shifting system includes the bicycle driving assembly 16 and the chain guide 30 configured to guide the bicycle chain C movably coupled to the bicycle driving assembly 18. The main controller 24 is configured to control the first actuator 42 and the second actuator 36, as shown in FIGS. 2, 4, 5 and 6.

Figure 9:
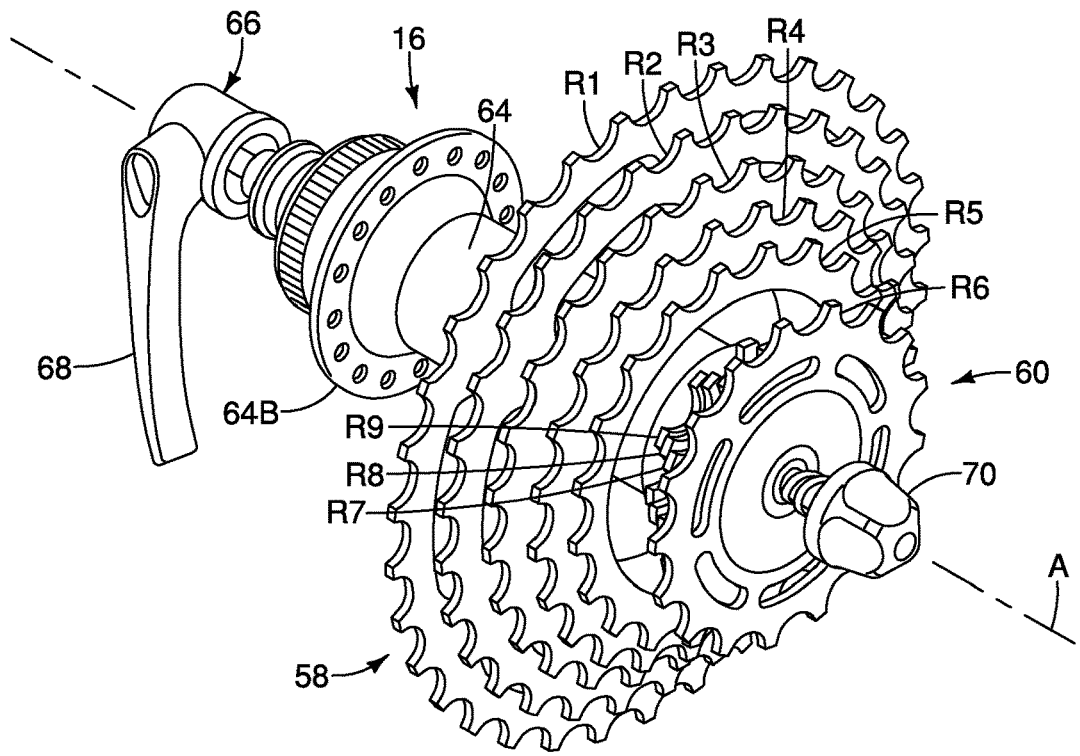
FIG. 9 is a perspective view of the bicycle driving assembly of FIG. 1 in which a first sprocket cluster and a second sprocket cluster are in a non-overlapping position in accordance with a first exemplary embodiment of the present invention.
Figure 10:
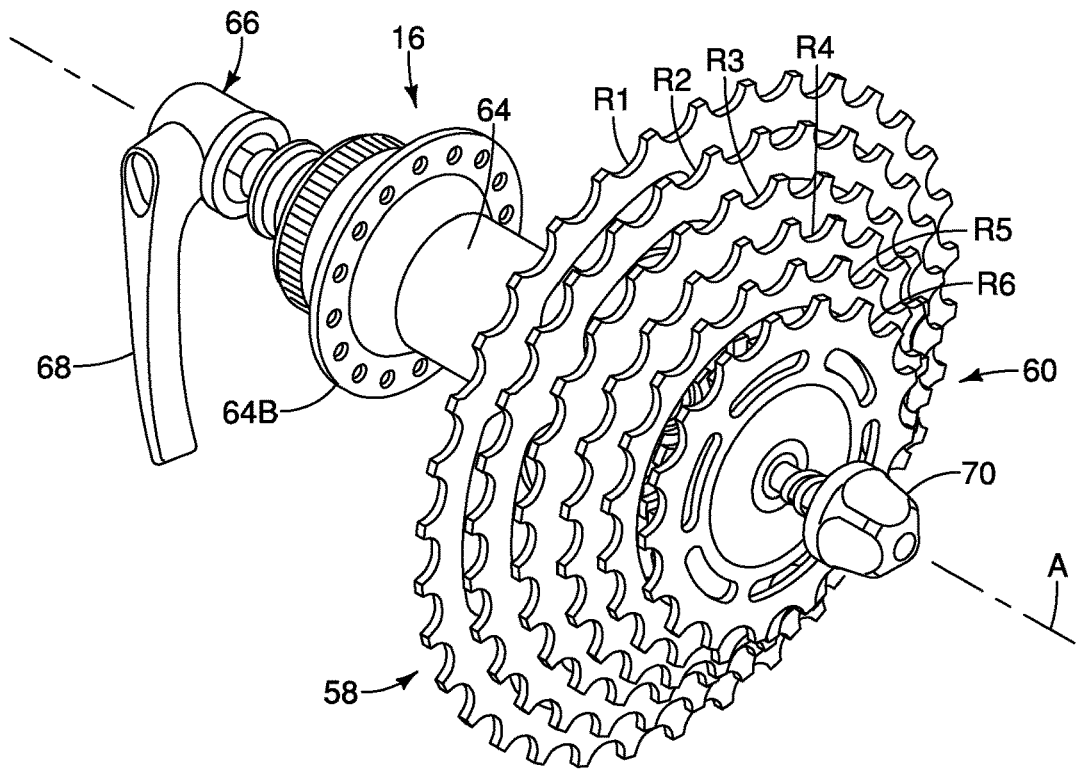
FIG. 10 is a perspective view of the bicycle driving assembly of FIG. 9 in which the first sprocket cluster is axially moved to an overlapping position with the second sprocket cluster.

Referring to FIGS. 8 to 12, the bicycle driving assembly 16 is illustrated in accordance with an exemplary embodiment of the present invention. The bicycle driving assembly 16 includes a first sprocket cluster 58, a second sprocket cluster 60 and the first actuator 42. The first sprocket cluster 58 includes at least one first sprocket, such as the rear sprocket R1, configured to be rotatable about the rotational axis A. The second sprocket cluster 60 includes at least one second sprocket, such as the rear sprocket R6, configured to be rotatable about the rotational axis A. Preferably, as shown in FIGS. 9 and 10, the at least one first sprocket includes a plurality of the first sprockets, such as rear sprockets R1 to R5. Preferably, the at least one second sprocket includes a plurality of second sprockets, such as rear sprockets R6 to R9. The first and second sprocket clusters 58 and 60 can include any suitable number of sprockets.

The first actuator 42 is configured to move the first sprocket cluster 58 and the second sprocket cluster 60 relative to one another in the axial direction of the rotational axis A. As illustrated in the exemplary embodiment of FIGS. 9 to 16, the second sprocket cluster 60 is axially fixed and the first sprocket cluster 58 moves axially in the axial direction of the rotational axis A relative to the second sprocket cluster 60. In other words, the first sprocket cluster 58 is configured to be axially moved by the first actuator 42 in a mounted state where the bicycle driving assembly 16 is mounted to the bicycle 10, and the second sprocket cluster 60 is configured to be non-movably fixed in the axial direction in the mounted state. As illustrated in another exemplary embodiment of FIGS. 17 to 23, the first sprocket cluster 158 is axially fixed and the second sprocket cluster 160 moves axially in the axial direction of the rotational axis A relative to the first sprocket cluster 158.

Figure 12:
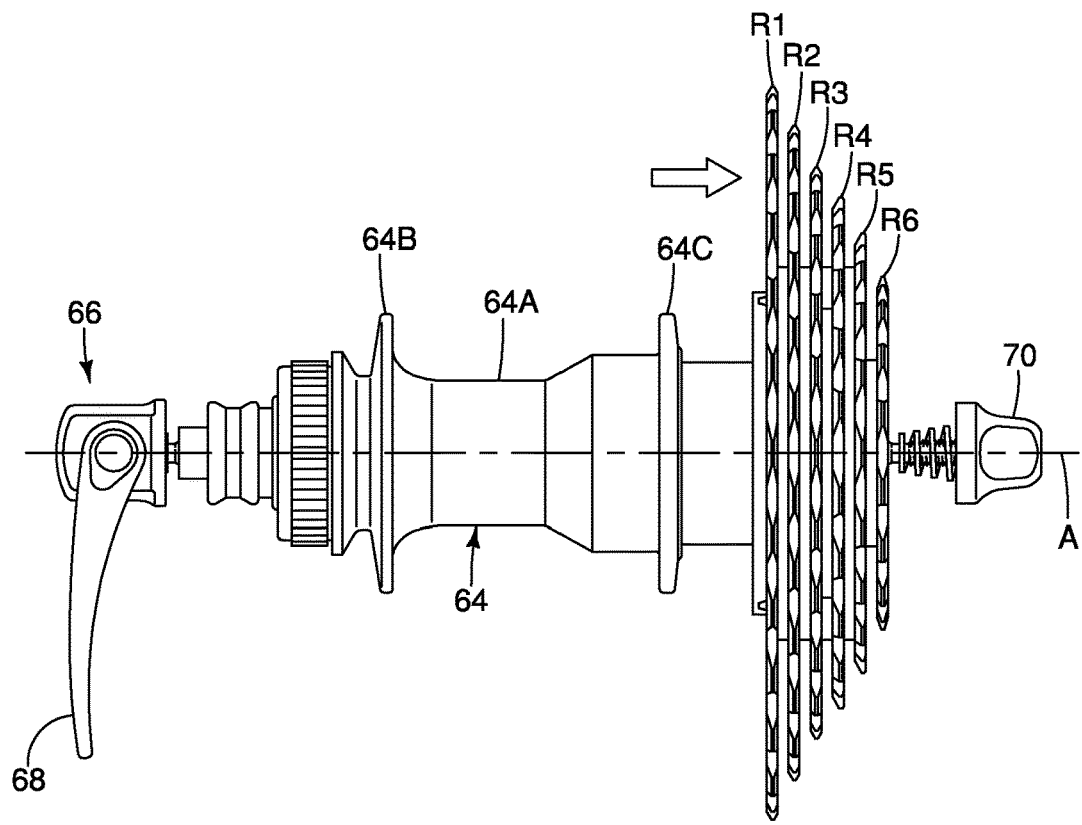
FIG. 12 is a side elevational view of the bicycle driving assembly of FIG. 10.
Figure 14:
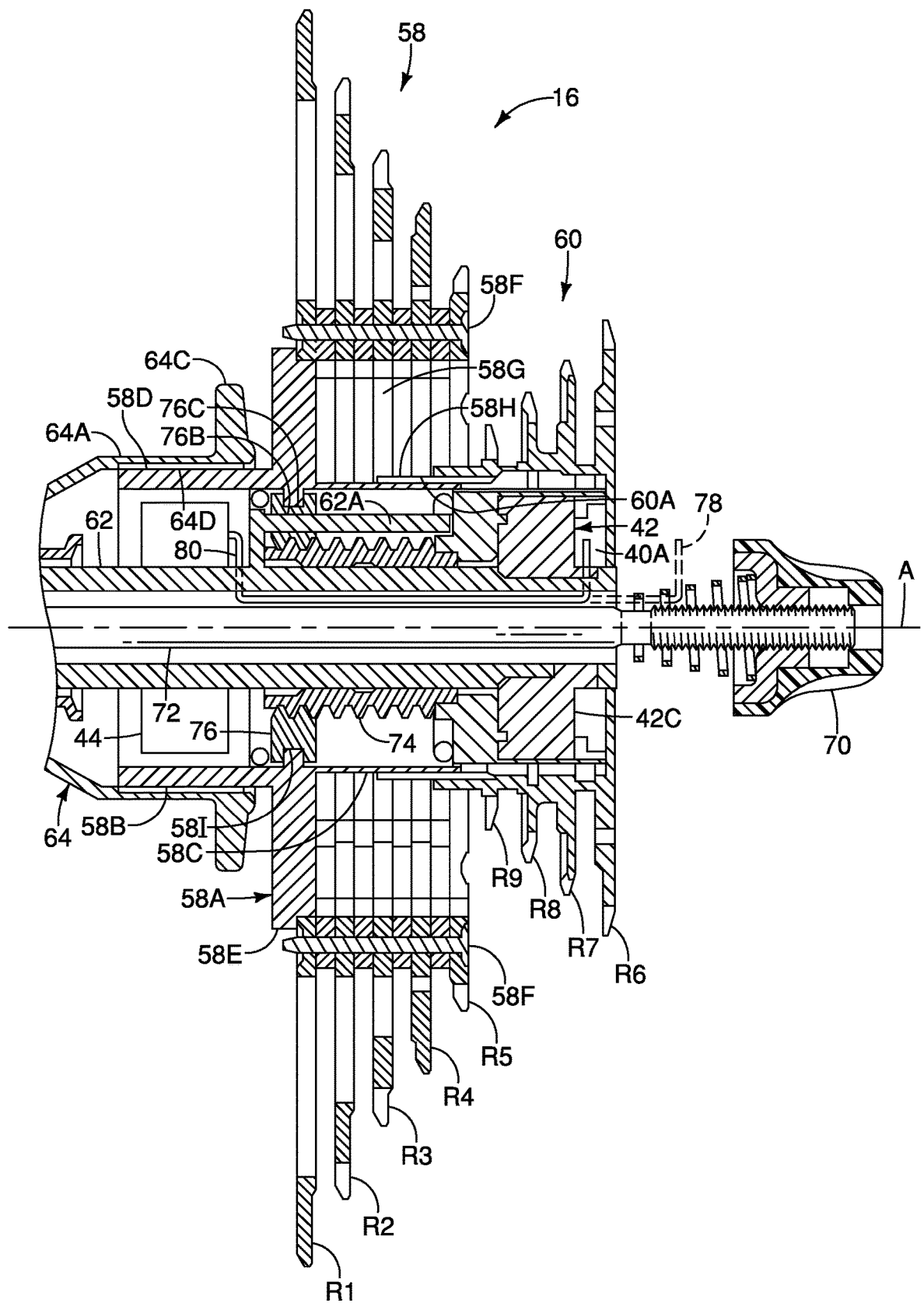
FIG. 14 is a side elevational view in cross section of the bicycle driving assembly of FIG. 9.

As shown in FIG. 1, the bicycle driving assembly 16 is mounted to the frame 14a. The bicycle driving assembly 16 includes a hub axle 62 and a hub shell 64, as shown in FIGS. 11, 12 and 14. The hub axle 62 is formed in a substantially tubular shape. The hub axle 62 is attached to the frame 14a such that the hub axle 62 is non-rotatable with respect to the frame 14a. The hub shell 64 is configured to rotate around the hub axle 62. A center axis of the hub axle 62 and a center axis of the hub shell 64 are disposed concentrically with the rotational axis A.

A mounting mechanism 66 includes a lever 68, a nut 70 and a connecting axle 72. The connecting axle 72 of the mounting mechanism 66 passes through an inner peripheral portion of the hub axle 62. The lever 68 and the nut 70 are screwed to both end portions of the connecting axle 72, respectively. In this state, the hub axle 62 is mounted to the frame 14a by operating the lever 68.

The axial direction includes the axial direction parallel to the rotational axis A and an axial direction along the rotational axis A. A circumferential direction is a circumferential direction of a circle with the rotational axis A. A radial direction is a radial direction away from the rotational axis A as a center of the circle.

As shown in FIGS. 11, 12 and 14, the hub shell 64 includes a shell body 64A and a pair of flange portions 64B and 64C. The shell body 64A is formed in a substantially tubular shape. The hub axle 62 is disposed in the inner peripheral portion of the shell body 64A. The shell body 64A is disposed spaced from the hub axle 62 at a predetermined interval with respect to the radial direction. The shell body 64A is rotatably supported with respect to the hub axle 62 via bearings (not shown).

The spokes of the rear wheel RW (FIG. 1) are attached to the flange portions 64B and 64C. The flange portions 64B and 64C are provided on opposite ends of the shell body 64A. Specifically, each of the flange portions 64B and 64C is formed in an annular shape. The flange portions 64B and 64C protrude from an outer peripheral portion of the shell body 64A to an outside in the radial direction. In other words, the flange portion 64B and the flange portion 64C are spaced apart at an interval with each other in the axial direction. The flange portion 64B and the flange portion 64C protrude from both end portions of the shell body 64A to the outside in the radial direction, respectively.

Figure 15:
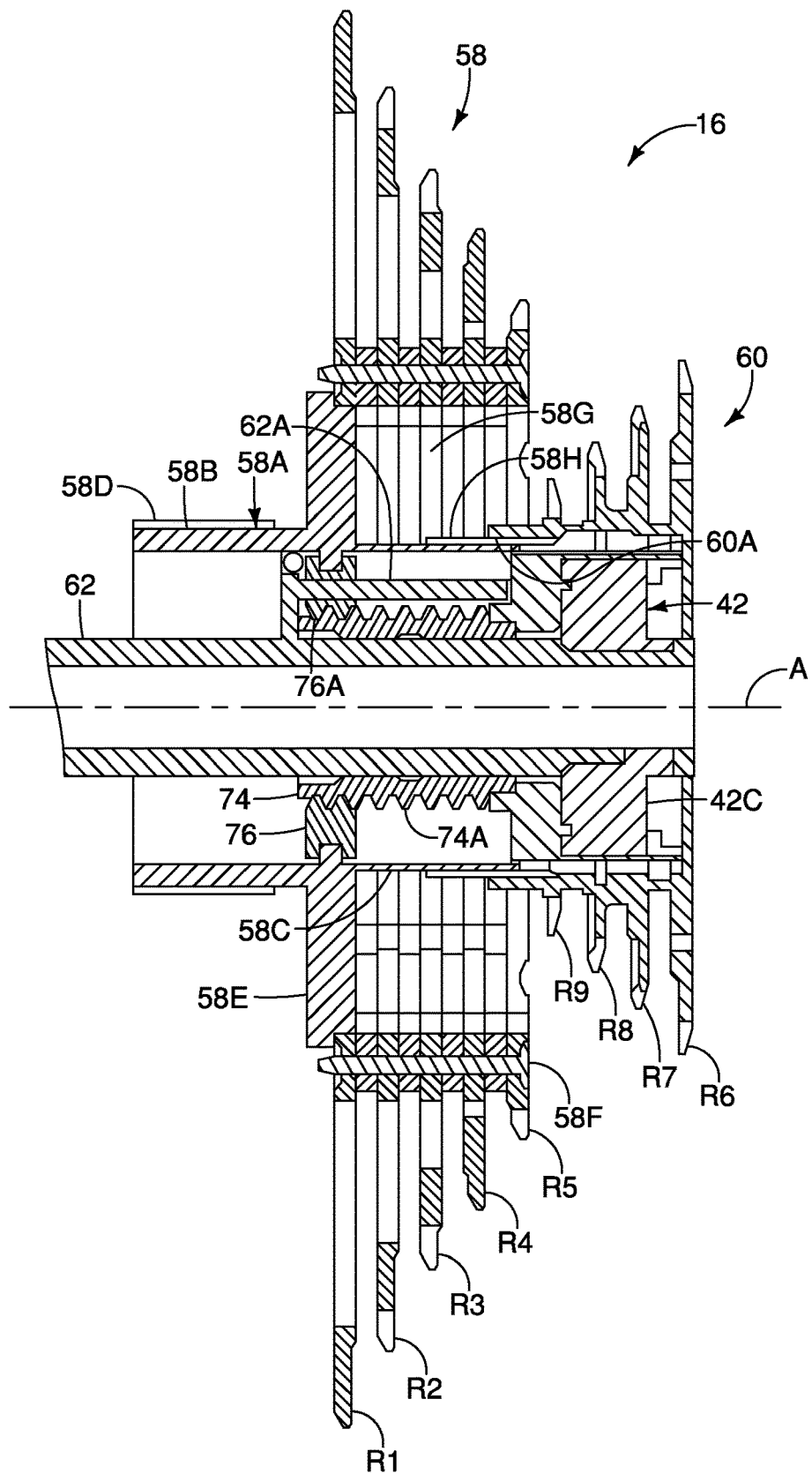
FIG. 15 is a side elevational view in cross section of the bicycle driving assembly of FIG. 9 with a hub shell and connecting axle removed for clarity.
Figure 16:
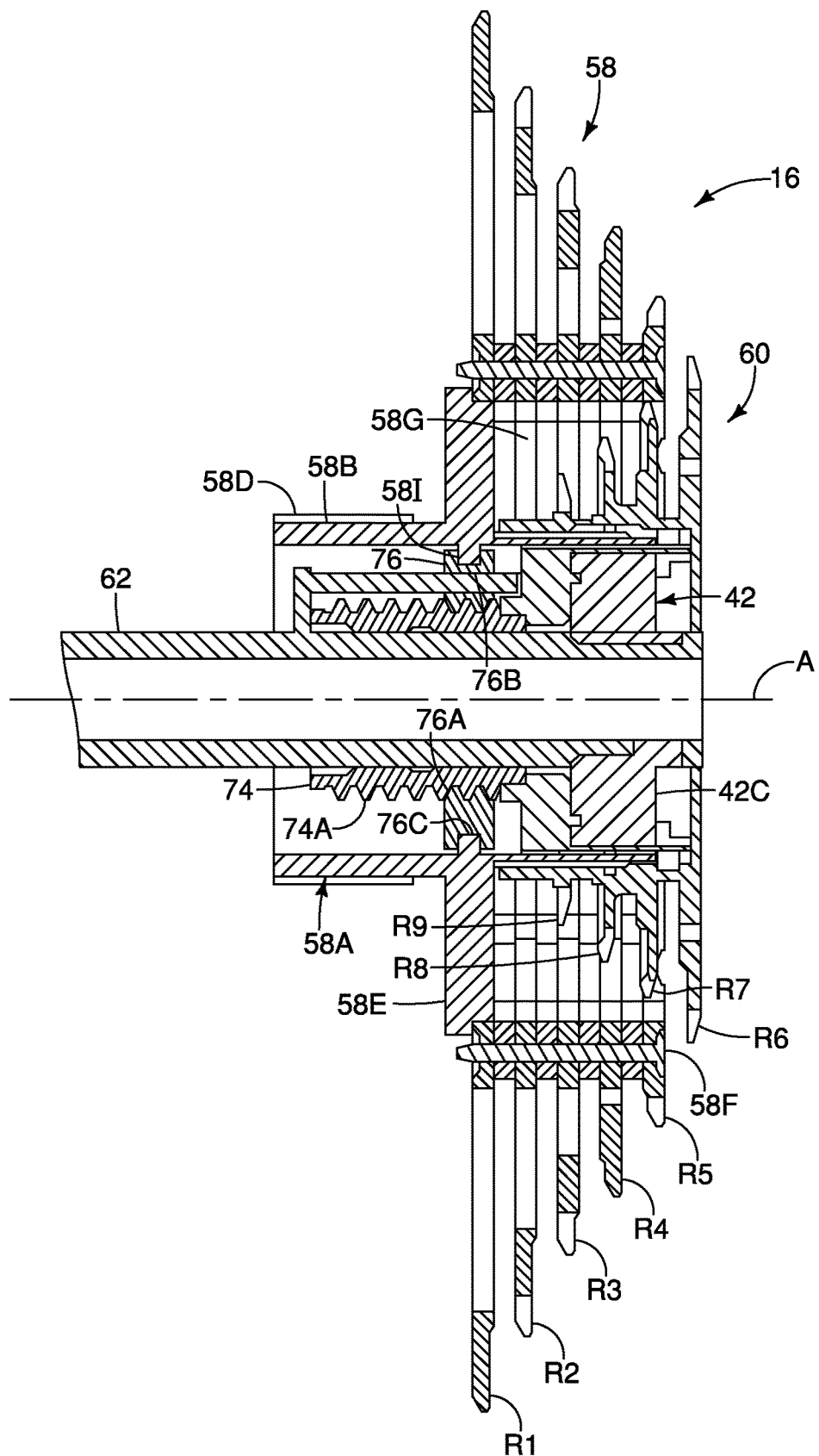
FIG. 16 is a side elevational view in cross section of the bicycle driving assembly of FIG. 10 with a hub shell and connecting axle removed for clarity.

The first sprocket cluster 58 is attached to the hub shell 64, as shown in FIGS. 14 to 16, such that the first sprocket cluster 58 rotates with the hub shell 64. The first sprocket cluster includes a first sprocket support body 58A having a first tubular portion 58B and a second tubular portion 58C. The first tubular portion 58B of the first sprocket support body 58A includes a first axially extending spline 58D on the outer surface of the first tubular portion 58B received by a first groove 64D on an inner surface of the shell body 64A. The first spline 58D being received by the first groove 64D allows the first sprocket cluster 58 to move in the axial direction of the rotational axis A relative to the shell body 64A, and prevents the first sprocket cluster 58 from rotating relative to the shell body 64A. Rotation of one of the first and second sprocket clusters 58 and 60 results in rotation of the shell body 64A. Preferably, each of the first tubular portion 58B and the shell body 64A includes a stopper portion (not shown) to restrict the axial movement of the first sprocket support body 58A. Alternatively, the first sprocket cluster 58 can have the groove and the shell body 64*a* can have the spline. The first rear sprocket R1 is supported by a flange portion 58E extending radially outward from the first and second tubular portions 58B and 58C. Fasteners 58F fix the first sprockets R1 to R5 together. The outer diameters of the first sprockets R1 to R5 decrease in the axial direction away from the bicycle frame 14*a*. A second sprocket cluster receiving area 58G is formed between inner radial surfaces of the first sprockets R1 to R5 and the outer surface of the second tubular portion 58C.

The second sprocket cluster 60 is attached to first sprocket cluster 58 such that the first sprocket cluster 58 is axially movable relative to the second sprocket cluster 60 and non-rotatable relative to the second sprocket cluster 60. As shown in FIGS. 9 and 14, the second sprocket cluster 60 is at least partially located outward of the first sprocket cluster 58 in the mounted state where the bicycle driving assembly 16 is mounted to the bicycle 10. In other words, the second sprocket cluster 60 is at least partially located outward of the first sprocket cluster 58 in the axial direction with respect to the bicycle frame 14*a* where the bicycle driving assembly 16 is mounted to the bicycle 14*a*. A second axially extending spline 58H on the outer surface of the second tubular portion 58C is received by a second groove 60A on an inner surface of the second sprocket cluster 60. The second spline 58H being received by the second groove 60A allows the first sprocket cluster 58 to move in the axial direction of the rotational axis A relative to the second sprocket cluster 60, and prevents the first sprocket cluster 58 from rotating relative to the second sprocket cluster 60. Rotation of one of the first and second sprocket clusters 58 and 60 results in rotation of the other of the first and second sprocket clusters 58 and 60. Alternatively, the first sprocket cluster 58 can have the groove and the second sprocket cluster 60 can have the spline.

The second sprocket cluster 60 includes second sprockets R6 to R9, as shown in FIGS. 14 to 16. The outer diameters of the second rear sprockets R6 to R9 increase in the axial direction away from the bicycle frame 14*a*. The second sprocket cluster 60 is unitarily formed as a single, one-piece member, although the second rear sprockets can be mounted to a second sprocket cluster support body in a similar manner as the first sprocket cluster 58.

As illustrated in FIGS. 9 and 10, the at least one first sprocket, such as the first sprocket R1, has a total tooth number that is greater than a total tooth number of the at least one second sprocket, such as the second sprocket R6. The total tooth number of each of the first sprockets R1 to R5 decreases in the axial direction away from the bicycle frame 14*a*. The total tooth number of each of the second sprockets R6 to R9 decreases in the axial direction toward the bicycle frame 14*a*. The at least one first sprocket includes a first largest sprocket and a first smallest sprocket, such as the first sprockets R1 and R5, respectively, as shown in FIG. 14. The at least one second sprocket includes a second largest sprocket and a second smallest sprocket, such as the second sprockets R6 and R9, respectively. The first largest sprocket R1 is positioned closer to the bicycle frame 14*a* of the bicycle 10 than the first smallest sprocket R5 in a mounted state where the bicycle driving assembly 16 is mounted to the bicycle 10. The second smallest sprocket R9 is positioned closer to the bicycle frame 14*a* of the bicycle 10 than the second largest sprocket R6 in the mounted state. The first smallest sprocket R5 is positioned closer to the bicycle frame 14*a* of the bicycle 10 than the second smallest sprocket R9 in a state where the bicycle driving assembly 16 is mounted to the bicycle 10 and the one of the first sprocket cluster 58 and the second sprocket cluster 60 is positioned in the non-overlapping position, as shown in FIGS. 14 and 15.

As shown in FIGS. 5, 6 and 14, the first actuator 42 includes a motor 42C having an output shaft 74 operatively coupled to one of the first sprocket cluster 58 and the second sprocket cluster 60 that is movably disposed relative to the other of the first sprocket cluster 58 and the second sprocket cluster 60. The motor 42C of the actuator 42 is fixed on the hub axle 62, as shown in FIGS. 14 to 16, such that the motor does not rotate relative to the hub axle 62. The hub axle 62 supports at least the motor 42C of the first actuator 42 being disposed coaxially around the hub axle 62. The motor 42C drives the output shaft 74 that is rotatable relative to the hub axle 62. The output shaft 74 has a first thread 74 that is engaged with a second thread of the one of the first sprocket cluster 58 and the second sprocket cluster 60 so that the one of the first sprocket cluster 58 and the second sprocket cluster 60 axially moves by a rotation of the output shaft 74. The first thread 74A of the output shaft 74 is an external thread disposed on an outer surface of the output shaft 74. A movable member 76 has a second thread 76A that threadedly engages the first thread 74*a* of the output shaft 74. The second thread 76A is an internal thread disposed on an internal surface of the movable member 76. The movable member 76 engages the first sprocket cluster 58, such that the second thread 76A is provided on the first sprocket cluster 58. Rotation of the output shaft 74 causes the movable member 76 to move in the axial direction of the rotational axis A along the output shaft 74. An opening 76B extending axially through the movable member 76 receives a guide member 62A to guide axial movement of the movable member 76 along the output shaft 74 and to prevent rotation of the movable member 76 with respect to the output shaft 74. The guide member 62A extends substantially parallel to the rotational axis A.

The flange portion 58D of the first sprocket cluster support body 58A has a radially inwardly extending protrusion 58I received by a corresponding groove 76C in an outer peripheral surface of the movable member 76, as shown in FIGS. 14 to 16. Axial movement of the movable member 76 causes axial movement of the first sprocket cluster 58 relative to the second sprocket cluster 60 in the axial direction of the rotational axis A. The movable member groove 76C allows rotational movement of the first sprocket cluster 58 relative to the movable member 76 when the first sprocket cluster 58 is caused to rotate.

The main controller 24 receives a signal from one of the operating devices OD1 and OD2 to perform a shift operation. The main controller 24 transmits a signal to the sprocket assembly electronic controller 40A, which controls the motor driver 42B to drive the electronic motor 42C. The sprocket assembly electronic controller 40A can receive the signal from the main controller wirelessly, as shown in FIG. 6, or the sprocket assembly electronic controller 40A can receive the signal from the main controller through an electric cable 78. Power can be supplied through the electric cable 78. Alternatively, in a wireless configuration, the power supply 44 is disposed coaxially around and supported by the hub axle 62. An electric cable 80 supplies power from the power source 44 to the sprocket assembly electronic controller 40A. Openings in the hub axle 62 allow the electric cables 78 and 80 to pass therethrough and to extend along an interior of the hub axle, as shown in FIG. 14. The output shaft 74 is rotated by the electronic motor 42C, thereby axially moving the movable member 76 along the output shaft 74. The axial movement of the movable member 76 further causes the first sprocket cluster 58 to move in the axial direction of the rotational axis A. As shown in FIG. 15, the first sprocket cluster 58 is movable from a position in which none of the first rear sprockets R1 to R5 overlap any of the second rear sprockets R6 to R9, to a position illustrated in FIG. 16 in which at least one of the second rear sprockets R6 to R9 is overlapped by the first sprocket cluster 58. In other words, one of the first sprocket cluster 58 and the second sprocket cluster 60 is movably disposed relative to the other of the first sprocket cluster 58 and the second sprocket cluster 60 between a non-overlapping position (FIG. 15) and an overlapping position (FIG. 16). The at least one second sprocket, such as the second sprocket R9, does not overlap with the first sprocket cluster 58 in the radial direction that is perpendicular to the rotational axis A while in the non-overlapping position, as shown in FIG. 15. The at least one second sprocket, such as the second sprocket R9, overlaps with the first sprocket cluster 58 in the radial direction while in the overlapping position, as shown in FIG. 16. The first sprocket cluster 58 defines the second sprocket cluster receiving area 58G. The at least one second sprocket, such as the second sprocket R9, is spaced from the second sprocket cluster receiving area 58G while in the non-overlapping position, as shown in FIGS. 14 and 15. The at least one second sprocket R9 is disposed inside the second sprocket receiving area 58G while in the overlapping position, as shown in FIG. 16. The second sprocket cluster receiving area 58G defined by the first sprocket cluster allows the first sprocket cluster 58 to move to an overlapping position with respect to the second sprocket cluster 60 as the diameter of the second sprocket cluster receiving area 58G is larger than an outer diameter of at least one of the second rear sprockets R6 to R9. As shown in FIG. 16, the second sprocket cluster receiving area 58G receives three of the second rear sprockets, R7 to R9, in the overlapping position.

Figure 13:
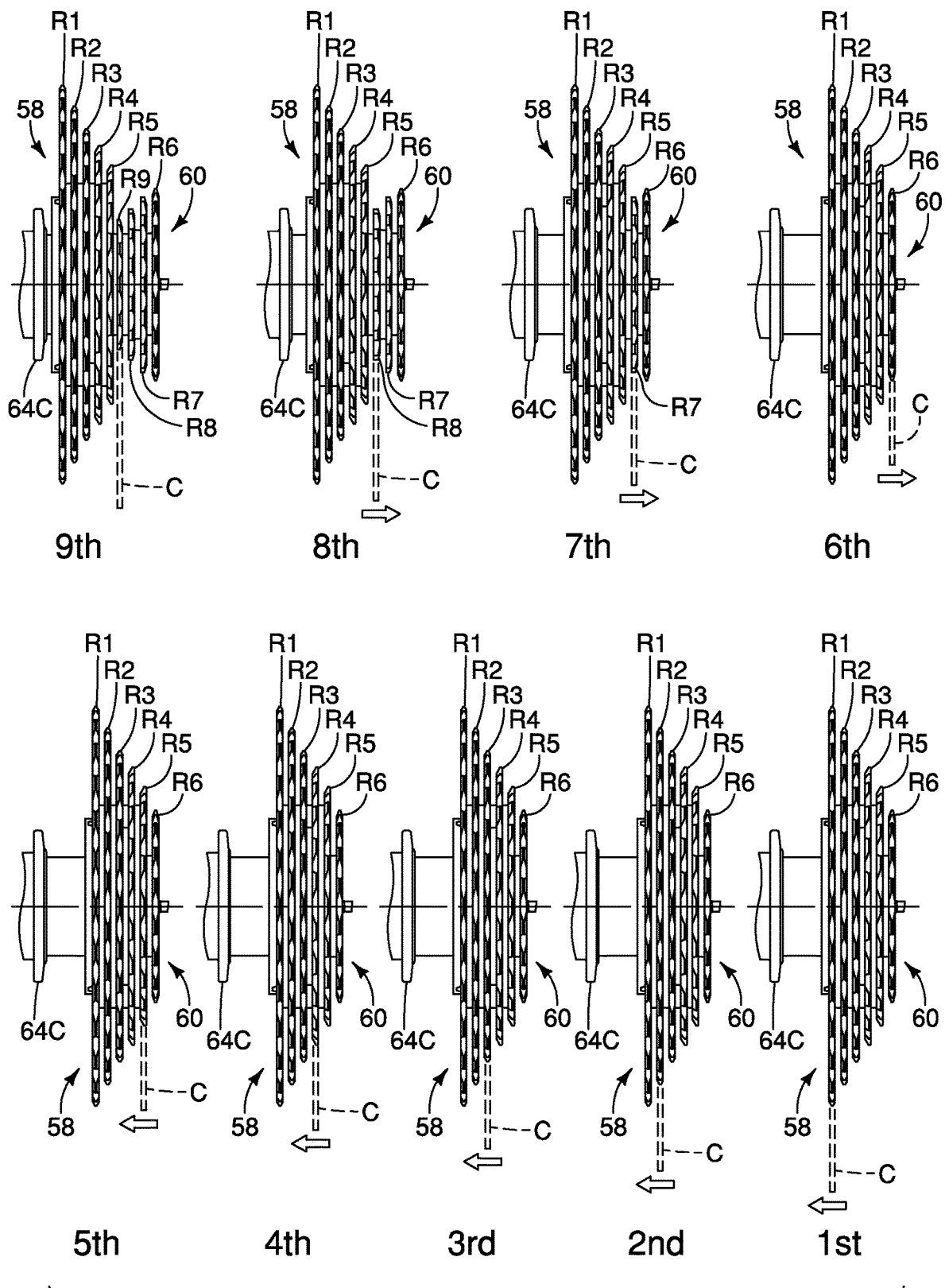
FIG. 13 are side elevational views illustrating a shifting operation from a ninth shift position to a first shift position in accordance with the first exemplary embodiment of the present invention.

The shifting operation from a top shift position (ninth shift position) to a low shift position (first shift position) is illustrated in FIG. 13. In the ninth shift position, the chain C engages the second rear sprocket R9. To shift to the eighth shift position, the electric rear derailleur RD shifts the chain C in the outward direction (away from the bicycle frame 14a) to the second rear sprocket R8. The first sprocket cluster 58 is also moved in the outward direction, such that the second rear sprocket R9 is received in the second sprocket cluster receiving area 58G in the first sprocket cluster 58 to be overlapped by the first sprocket cluster 58.

To shift to the seventh shift position illustrated in FIG. 13, the electric rear derailleur shifts RD the chain C in the outward direction (away from the bicycle frame 14a) to the second rear sprocket R7. The first sprocket cluster 58 is also moved outward in the axial direction, such that the second rear sprocket R8 is received in the second sprocket cluster receiving area 58G in the first sprocket cluster 58 to be overlapped by the first sprocket cluster 58.

To shift to the sixth shift position illustrated in FIG. 13, the electric rear derailleur RD shifts the chain C in the outward direction (away from the bicycle frame 14a) to the second rear sprocket R6. The first sprocket cluster 58 is also moved outward in the axial direction, such that the second rear sprocket R7 is received in the second sprocket cluster receiving area 58G in the first sprocket cluster 58 to be overlapped by the first sprocket cluster 58.

To shift to the fifth shift position illustrated in FIG. 13, the electric rear derailleur RD shifts the chain C in the inward direction (toward from the bicycle frame 14a) to the first rear sprocket R5. The first sprocket cluster 58 is not axially moved, such that the second rear sprockets R7 to R9 remain received in the second sprocket cluster receiving area 58G in the first sprocket cluster 58 to be overlapped by the first sprocket cluster 58.

To shift to the fourth shift position illustrated in FIG. 13, the electric rear derailleur RD shifts the chain C in the inward direction (toward from the bicycle frame 14a) to the first rear sprocket R4. The first sprocket cluster 58 is not axially moved, such that the second rear sprockets R7 to R9 remain received in the second sprocket cluster receiving area 58G in the first sprocket cluster 58 to be overlapped by the first sprocket cluster 58.

To shift to the third shift position illustrated in FIG. 13, the electric rear derailleur RD shifts the chain C in the inward direction (toward from the bicycle frame 14a) to the first rear sprocket R3. The first sprocket cluster 58 is not axially moved, such that the second rear sprockets R7 to R9 remain received in the second sprocket cluster receiving area 58G in the first sprocket cluster 58 to be overlapped by the first sprocket cluster 58.

To shift to the second shift position illustrated in FIG. 13, the electric rear derailleur RD shifts the chain C in the inward direction (toward from the bicycle frame 14a) to the first rear sprocket R2. The first sprocket cluster 58 is not axially moved, such that the second rear sprockets R7 to R9 remain received in the second sprocket cluster receiving area 58G in the first sprocket cluster 58 to be overlapped by the first sprocket cluster 58.

To shift to the first shift position illustrated in FIG. 13, the electric rear derailleur RD shifts the chain C in the inward direction (toward from the bicycle frame 14a) to the first rear sprocket R1. The first sprocket cluster 58 is not axially moved, such that the second rear sprockets R7 to R9 remain received in the second sprocket cluster receiving area 58G in the first sprocket cluster 58 to be overlapped by the first sprocket cluster 58. As illustrated in FIG. 13, the first sprocket cluster 58 is axially moved when shifting between the second rear sprockets of the second sprocket cluster 60, and the first sprocket cluster 58 is not axially moved when shifting between the first rear sprockets of the first sprocket cluster 58 or when shifting between the largest second rear sprocket R6 and the smallest first rear sprocket R5.

As shown in FIGS. 17 to 23, a bicycle driving assembly 116 in accordance with a second exemplary embodiment of the present invention is substantially similar to the bicycle driving assembly 16 of the first exemplary embodiment except for the differences described below. Similar parts are identified with similar reference numerals, except increased by 100 (that is, 1xx).

In the exemplary embodiment illustrated in FIGS. 17 to 23, the first sprocket cluster 158 is axially fixed and the second sprocket cluster 160 moves axially in the axial direction of the rotational axis A relative to the first sprocket cluster 158. In other words, the second sprocket cluster 160 is configured to be axially moved by the first actuator 142 in a mounted state where the bicycle driving assembly 116 is mounted to the bicycle 10 (FIG. 1), and the first sprocket cluster 158 is configured to be non-movably fixed in the axial direction in the mounted state.

As illustrated in the exemplary embodiment of FIGS. 17 to 23, the first sprocket cluster 158 is axially fixed and the second sprocket cluster 160 moves axially in the axial direction of the rotational axis A relative to the first sprocket cluster 158. In other words, the second sprocket cluster 160 is configured to be axially moved by the first actuator 142 in a mounted state where the bicycle driving assembly 116 is mounted to the bicycle 10, and the first sprocket cluster 158 is configured to be non-movably fixed in the axial direction in the mounted state.

Figure 19:
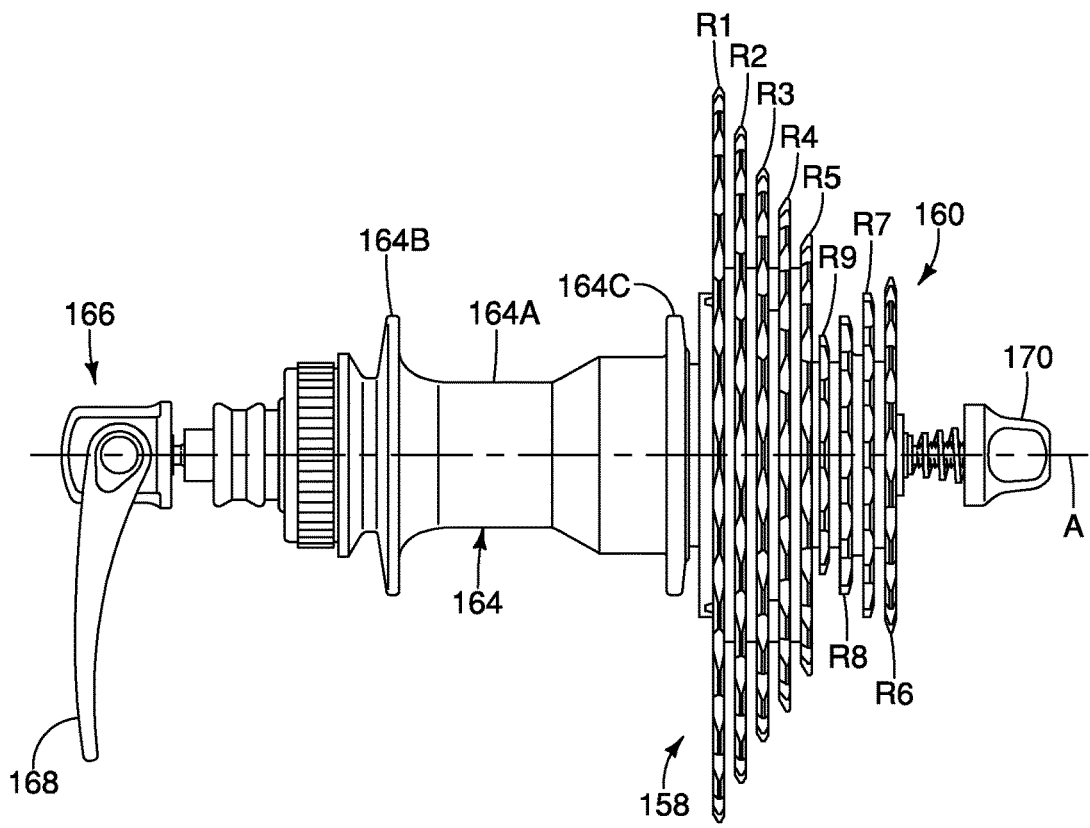
FIG. 19 is a side elevational view of the bicycle driving assembly of FIG. 17.
Figure 22:
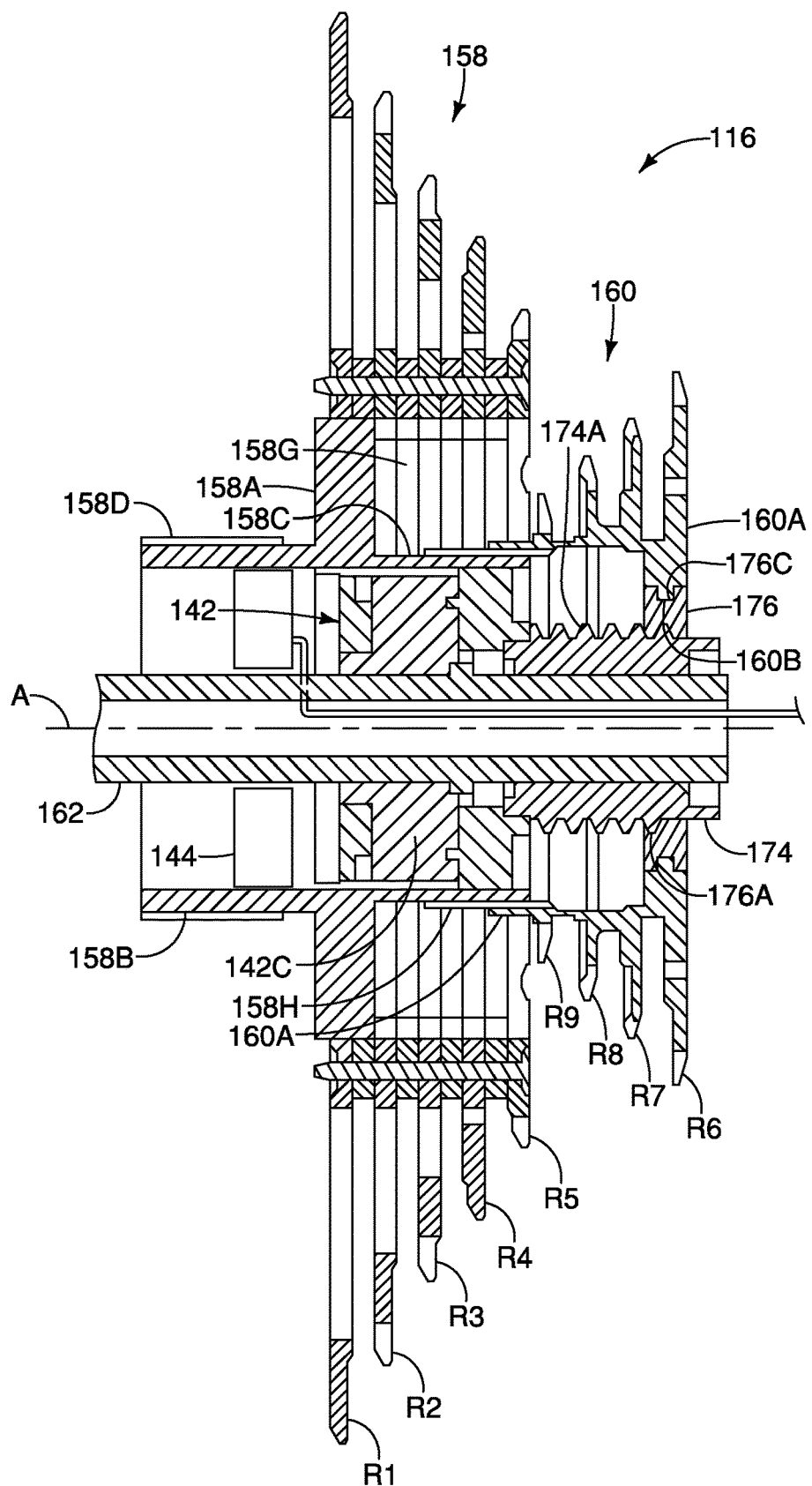
FIG. 22 is a side elevational view in cross section of the bicycle driving assembly of FIG. 17 with a hub shell and connecting axle removed for clarity.

The second sprocket cluster 160 is attached to first sprocket cluster 158 such that the second sprocket cluster 160 is axially movable relative to the first sprocket cluster 158 and non-rotatable relative to the first sprocket cluster 158. As shown in FIGS. 19 and 22, the second sprocket cluster 160 is at least partially located outward of the first sprocket cluster 158 in the mounted state where the bicycle driving assembly 116 is mounted to the bicycle 10. In other words, the second sprocket cluster 160 is at least partially located outward of the first sprocket cluster 158 in the axial direction with respect to the bicycle frame 14a (FIG. 1) where the bicycle driving assembly 116 is rotatably mounted to the bicycle 10. The first sprocket cluster 158 includes a first sprocket support body 158A having a first tubular portion 158B and a second tubular portion 158C. A first tubular portion 158B of the first sprocket support body 158A includes a first axially extending spline 158D on the outer surface of the first tubular portion 158B received by a first groove (not shown) on an inner surface of the shell body 164A. The first spline 158D being received by the first groove prevents the first sprocket cluster 158 from rotating relative to the shell body 164A. Rotation of one of the first and second sprocket clusters 158 results in rotation of the shell body 164A. Alternatively, the first sprocket cluster 158 can have the groove and the shell body 164A can have the spline. A second axially extending spline 158H on the outer surface of the second tubular portion 158C is received by a second groove 160A on an inner surface of the second sprocket cluster 160. The second spline 158H being received by the second groove 160A allows the second sprocket cluster 160 to move in the axial direction of the rotational axis A relative to the first sprocket cluster 158, and prevents the second sprocket cluster 160 from rotating relative to the first sprocket cluster 158. Rotation of one of the first and second sprocket clusters 158 and 160 results in rotation of the other of the first and second sprocket clusters 158 and 160. Alternatively, the first sprocket cluster 158 can have the groove and the second sprocket cluster 160 can have the spline.

Figure 23:
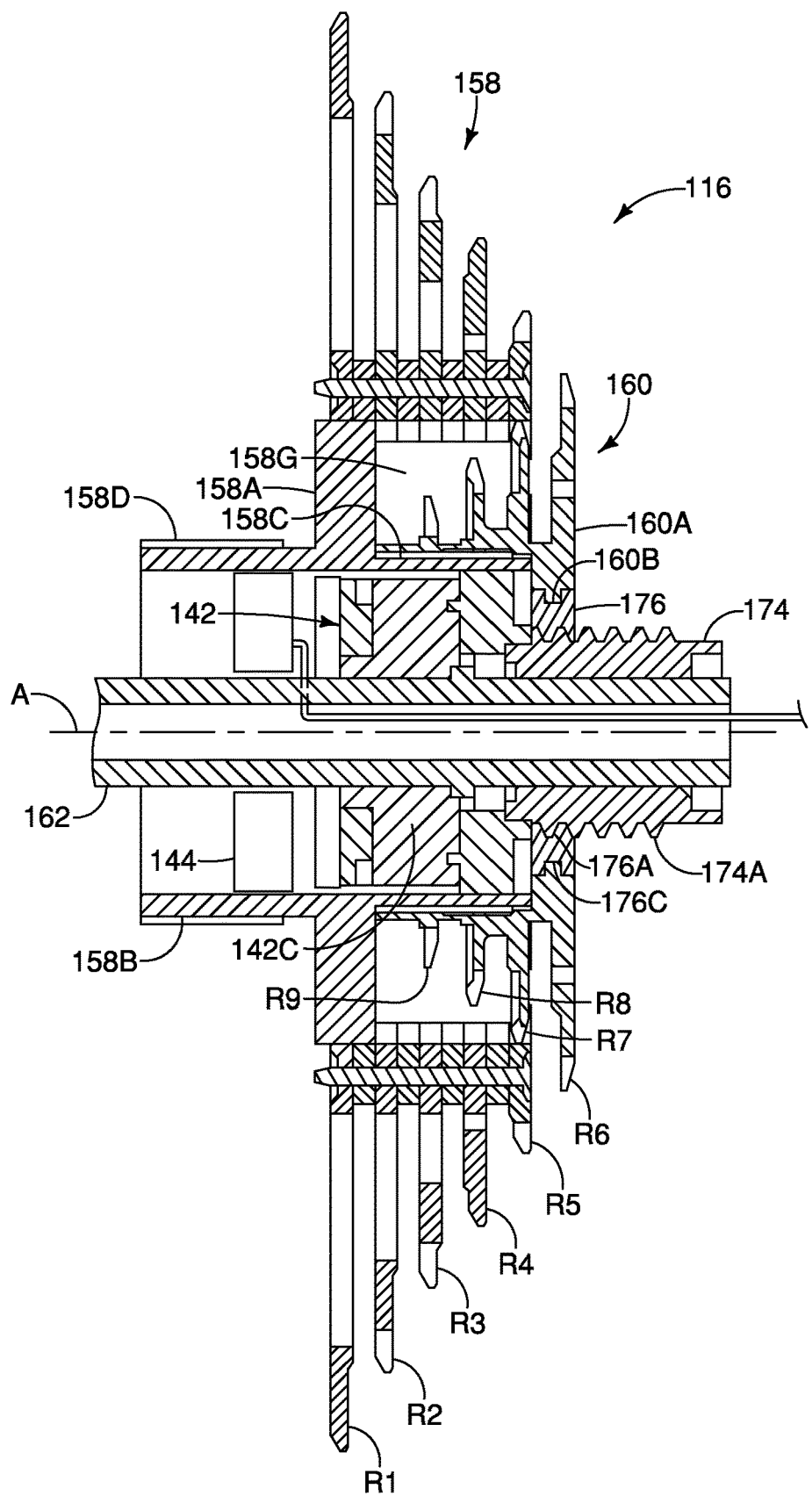
FIG. 23 is a side elevational view in cross section of the bicycle driving assembly of FIG. 18 with a hub shell and connecting axle removed for clarity.

As shown in FIGS. 22 and 23, the first actuator 142 includes a motor 142C having an output shaft 174 operatively coupled to the second sprocket cluster 160 that is movably disposed relative to the first sprocket cluster 158. The motor 142C of the actuator 142 is fixed on the hub axle 162 such that the motor does not rotate relative to the hub axle 162. The hub axle 162 supports at least the motor 142C of the first actuator 142 being disposed coaxially around the hub axle 162. The motor 142C drives the output shaft 174 that is rotatable relative to the hub axle 162. The output shaft 174 has a first thread 174A that is engaged with a second thread 176A of the second sprocket cluster 160 so that the second sprocket cluster 160 axially moves by a rotation of the output shaft 174. The first thread 174A of the output shaft 174 is an external thread disposed on an outer surface of the output shaft 174. A movable member 176 has a second thread 176A that threadedly engages the first thread 174a of the output shaft 174. The second thread 176A is an internal thread disposed on an internal surface of the movable member 176. The movable member 176 engages the second sprocket cluster 160, such that the second thread 176A is provided on the second sprocket cluster 160. Rotation of the output shaft 174 causes the movable member 176 to move in the axial direction of the rotational axis A along the output shaft 174.

A support body 160A of the second sprocket cluster 160 has a radially inwardly extending protrusion 160B received by a corresponding groove 176C in an outer peripheral surface of the movable member 176, as shown in FIGS. 22 and 23. Axial movement of the movable member 176 causes axial movement of the second sprocket cluster 160 relative to the first sprocket cluster 158 in the axial direction of the rotational axis A. The movable member groove 176C allows rotational movement of the second sprocket cluster 160 relative to the movable member 176 when the second sprocket cluster 160 is caused to rotate.

Figure 17:
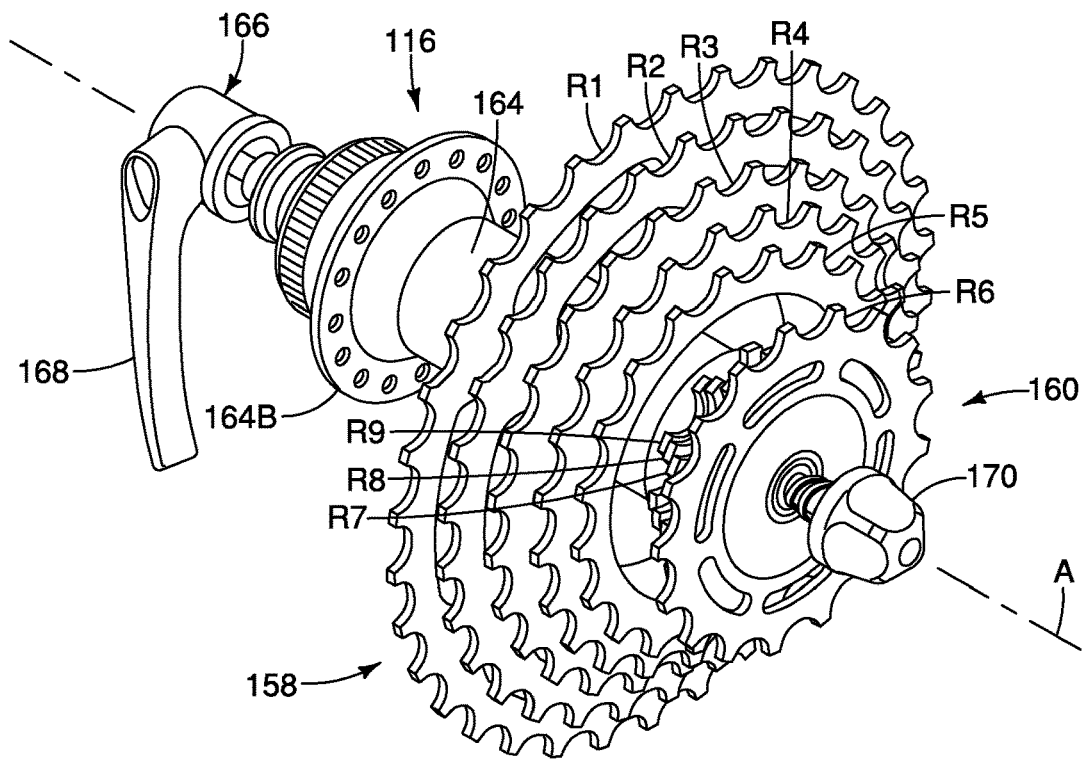
FIG. 17 is a perspective view of the bicycle driving assembly of FIG. 1 in which a first sprocket cluster and a second sprocket cluster are in a non-overlapping position in accordance with another exemplary embodiment of the present invention.
Figure 18:
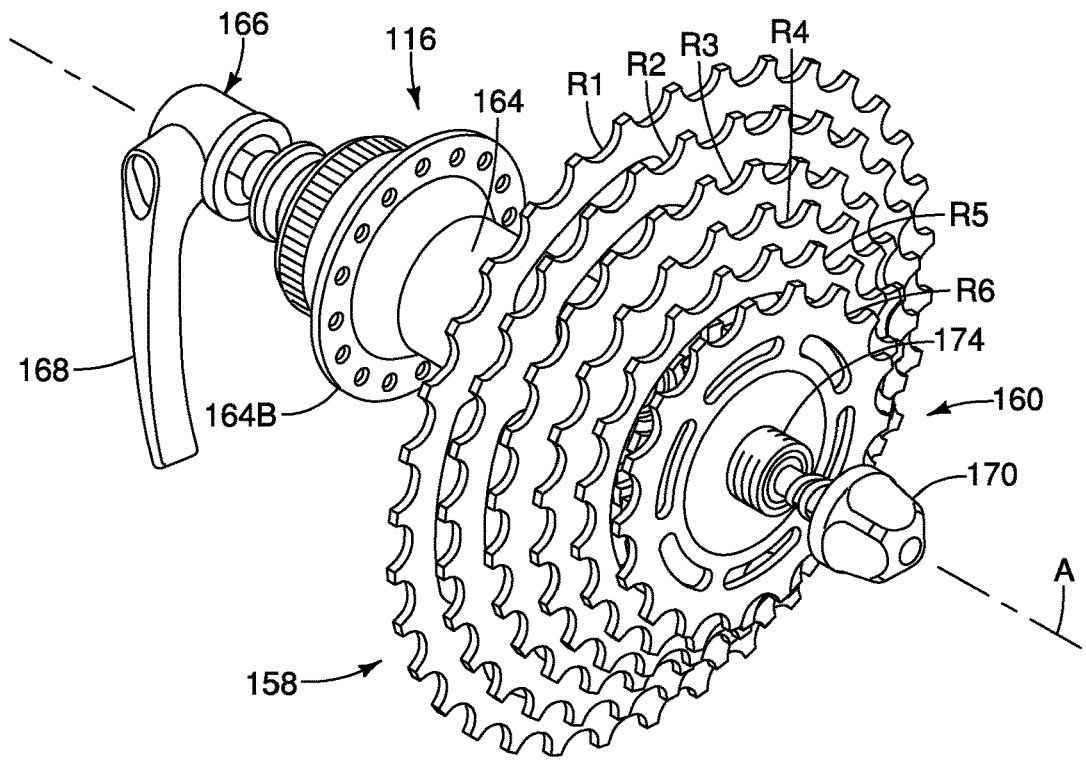
FIG. 18 is a perspective view of the bicycle driving assembly of FIG. 17 in which the second sprocket cluster is axially moved to an overlapping position with the first sprocket cluster.
Figure 20:
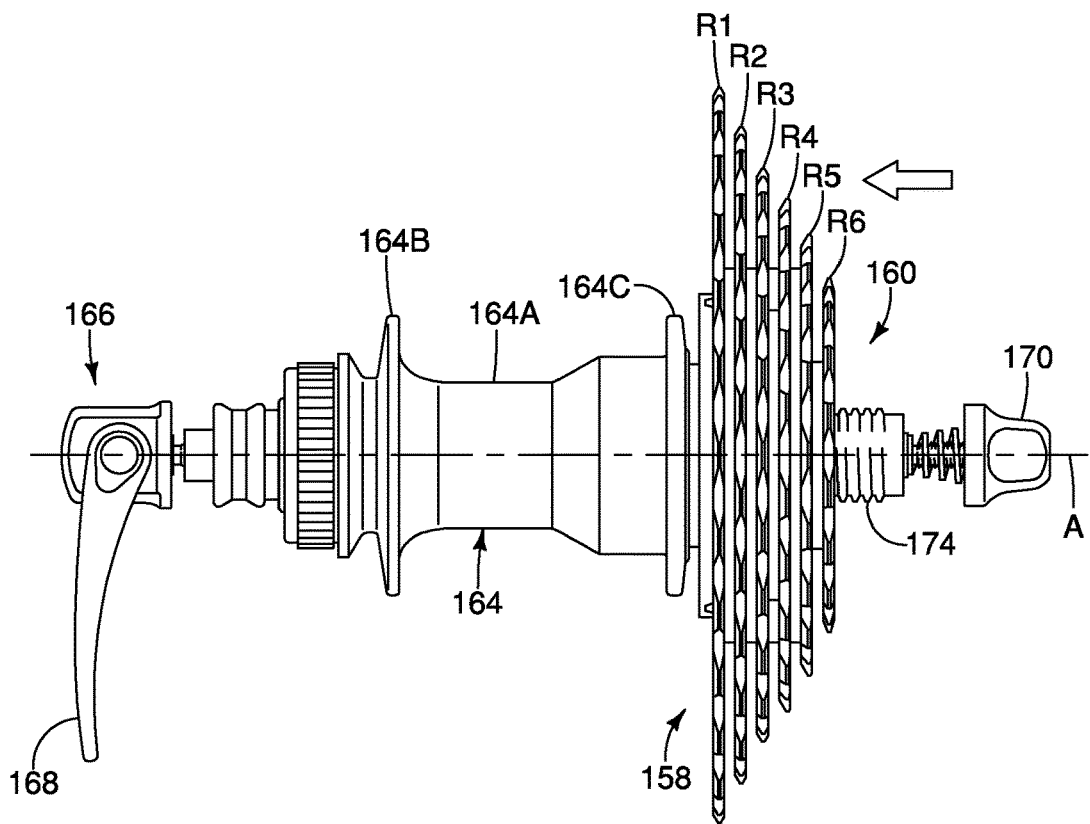
FIG. 20 is a side elevational view of the bicycle driving assembly of FIG. 18.

The output shaft 174 is rotated by the electronic motor 142C, thereby axially moving the movable member 176 along the output shaft 174. The axial movement of the movable member 176 further causes the second sprocket cluster 160 to move in the axial direction of the rotational axis A. As shown in FIGS. 17, 19 and 22, the second sprocket cluster 160 is movable from a position in which none of the first rear sprockets R1 to R5 overlap any of the second rear sprockets R6 to R9, to a position illustrated in FIGS. 18, 20 and 22 in which at least one of the second rear sprockets R6 to R9 is overlapped by the first sprocket cluster 158. In other words, one of the first sprocket cluster 158 and the second sprocket cluster 160 is movably disposed relative to the other of the first sprocket cluster 158 and the second sprocket cluster 160 between a non-overlapping position (FIGS. 17, 19 and 22) and an overlapping position (FIGS. 18, 20 and 22). The at least one second sprocket, such as the second sprocket R9, does not overlap with the first sprocket cluster 158 in the radial direction that is perpendicular to the rotational axis A while in the non-overlapping position, as shown in FIGS. 17, 19 and 22. The at least one second sprocket, such as the second sprocket R9, overlaps with the first sprocket cluster 158 in the radial direction while in the overlapping position, as shown in FIGS. 18, 20 and 22. The first sprocket cluster 158 defines the second sprocket cluster receiving area 158G. The at least one second sprocket, such as the second sprocket R9, is spaced from the second sprocket cluster receiving area 158G while in the non-overlapping position, as shown in FIG. 22. The at least one second sprocket R9 is disposed inside the second sprocket receiving area 158G while in the overlapping position, as shown in FIG. 23. The second sprocket cluster receiving area 158G defined by the first sprocket cluster 158 allows the second sprocket cluster 160 to move to an overlapping position with respect to the first sprocket cluster 158 as the diameter of the second sprocket cluster receiving area 158G is larger than an outer diameter of at least one of the second rear sprockets R6 to R9. As shown in FIG. 23, the second sprocket cluster receiving area 158G receives three of the second rear sprockets, R7 to R9, in the overlapping position.

Figure 21:
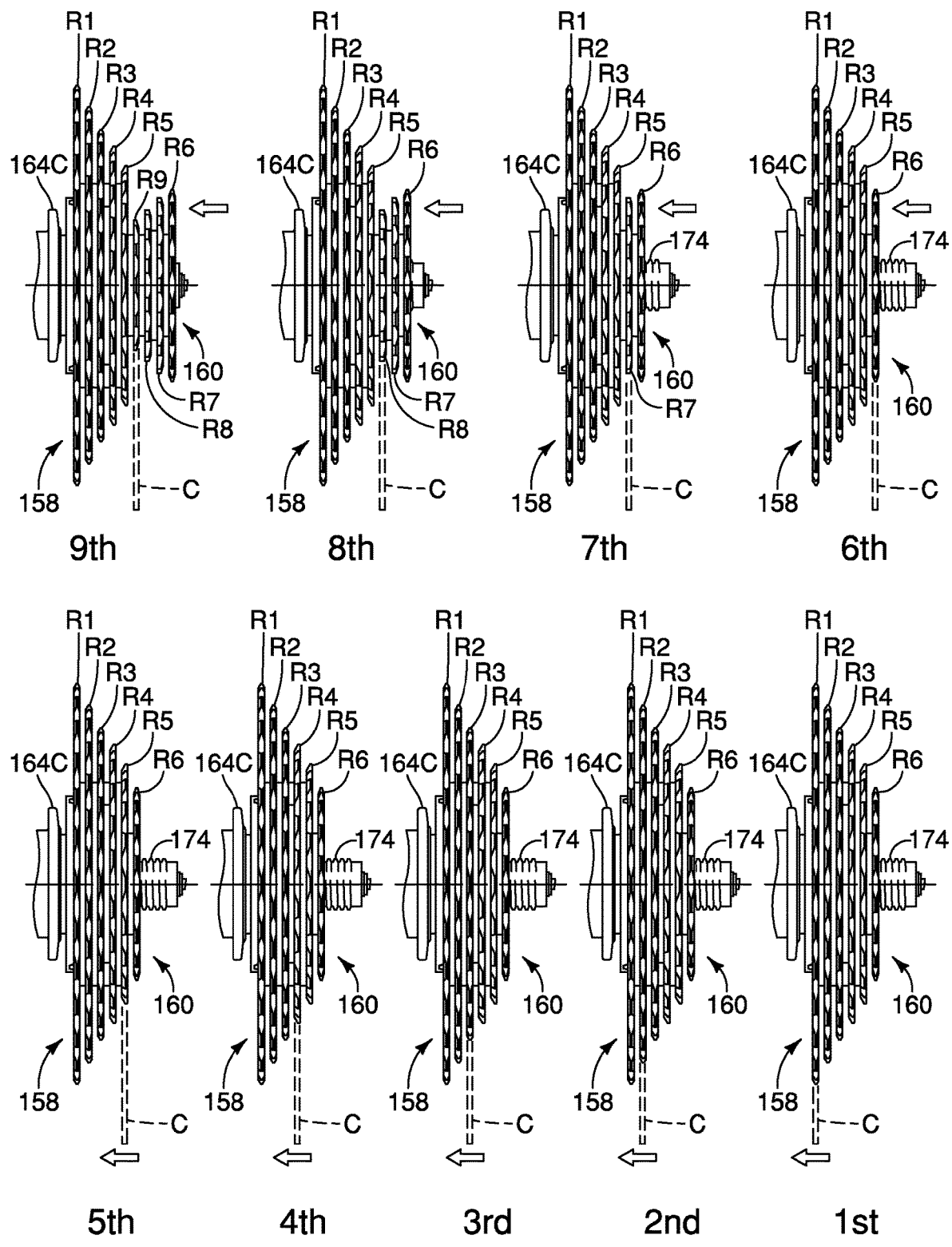
FIG. 21 are side elevational views illustrating a shifting operation from a ninth shift position to a first shift position of the bicycle driving assembly of FIG. 17.

The shifting operation from a top shift position (ninth shift position) to a low shift position (first shift position) is illustrated in FIG. 21. In the ninth shift position, the chain C engages the second rear sprocket R9. To shift to the eighth shift position, the electric rear derailleur RD shifts the chain C in the outward direction (away from the bicycle frame 14a) to the second rear sprocket R8. The second sprocket cluster 158 is also moved in the inward direction, such that the second rear sprocket R9 is received in the second sprocket cluster receiving area 158G in the first sprocket cluster 158 to be overlapped by the first sprocket cluster 158.

To shift to the seventh shift position illustrated in FIG. 22, the electric rear derailleur RD shifts the chain C in the outward direction (away from the bicycle frame 14a) to the second rear sprocket R7. The second sprocket cluster 160 is also moved inward in the axial direction, such that the second rear sprocket R8 is received in the second sprocket cluster receiving area 158G in the first sprocket cluster 158 to be overlapped by the first sprocket cluster 158.

To shift to the sixth shift position illustrated in FIG. 22, the electric rear derailleur RD shifts the chain C in the outward direction (away from the bicycle frame 14a) to the second rear sprocket R6. The second sprocket cluster 160 is also moved inward in the axial direction, such that the second rear sprocket R7 is received in the second sprocket cluster receiving area 158G in the first sprocket cluster 158 to be overlapped by the first sprocket cluster 158.

To shift to the fifth shift position illustrated in FIG. 22, the electric rear derailleur RD shifts the chain C in the inward direction (toward from the bicycle frame 14a) to the first rear sprocket R5. The second sprocket cluster 160 is not axially moved, such that the second rear sprockets R7 to R9 remain received in the second sprocket cluster receiving area 158G in the first sprocket cluster 158 to be overlapped by the first sprocket cluster 158.

To shift to the fourth shift position illustrated in FIG. 22, the electric rear derailleur RD shifts the chain C in the inward direction (toward from the bicycle frame 14a) to the first rear sprocket R4. The second sprocket cluster 160 is not axially moved, such that the second rear sprockets R7 to R9 remain received in the second sprocket cluster receiving area 158G in the first sprocket cluster 158 to be overlapped by the first sprocket cluster 158.

To shift to the third shift position illustrated in FIG. 22, the electric rear derailleur RD shifts the chain C in the inward direction (toward from the bicycle frame 14a) to the first rear sprocket R3. The second sprocket cluster 160 is not axially moved, such that the second rear sprockets R7 to R9 remain received in the second sprocket cluster receiving area 158G in the first sprocket cluster 158 to be overlapped by the first sprocket cluster 158.

To shift to the second shift position illustrated in FIG. 22, the electric rear derailleur RD shifts the chain C in the inward direction (toward from the bicycle frame 14a) to the first rear sprocket R2. The second sprocket cluster 160 is not axially moved, such that the second rear sprockets R7 to R9 remain received in the second sprocket cluster receiving area 158G in the first sprocket cluster 158 to be overlapped by the first sprocket cluster 158.

To shift to the first shift position illustrated in FIG. 22, the electric rear derailleur RD shifts the chain C in the inward direction (toward from the bicycle frame 14a) to the first rear sprocket R1. The second sprocket cluster 160 is not axially moved, such that the second rear sprockets R7 to R9 remain received in the second sprocket cluster receiving area 158G in the first sprocket cluster 158 to be overlapped by the first sprocket cluster 158. As illustrated in FIG. 22, the second sprocket cluster 160 is axially moved when shifting between the second rear sprockets of the second sprocket cluster 160, and the second sprocket cluster 160 is not axially moved when shifting between the first rear sprockets of the first sprocket cluster 158 or when shifting between the largest second rear sprocket R6 and the smallest first rear sprocket R5.

Although the preceding description refers to a first sprocket cluster and a second sprocket cluster of a bicycle rear sprocket assembly, the exemplary embodiments of the present invention are equally applicable to a bicycle front sprocket assembly.

In another exemplary embodiment of the present invention, a bicycle shifting system can include a gear box including the bicycle driving assembly of the present invention. In such a configuration, both the first and second sprocket clusters are axially movable relative to one another, such that the features of FIGS. 9 to 16 and FIGS. 17 to 23 are combined in a single assembly to provide first and second axially movable sprocket clusters. The chain guide is fixed in this configuration, such that the chain is shifted by the axial movement of the first or second sprocket cluster.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle driving assembly. Accordingly, these directional terms, as utilized to describe the bicycle driving assembly should be interpreted relative to a bicycle in an upright riding position on a horizontal surface and that is equipped with the bicycle driving assembly. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle driving assembly comprising:
   a first sprocket cluster including at least one first sprocket and configured to be rotatable about a rotational axis;
   a second sprocket cluster including at least one second sprocket configured to be rotatable about the rotational axis; and
   a first actuator configured to move the first sprocket cluster and the second sprocket cluster relative to one another in an axial direction of the rotational axis.

2. The bicycle driving assembly according to claim 1, wherein
   the first sprocket cluster is configured to be axially moved by the first actuator in a mounted state where the bicycle driving assembly is mounted to a bicycle, and
   the second sprocket cluster is configured to be non-movably fixed in the axial direction in the mounted state.

3. The bicycle driving assembly according to claim 1, wherein
   the second sprocket cluster is configured to be axially moved by the first actuator in a mounted state where the bicycle driving assembly is mounted to a bicycle, and
   the first sprocket cluster is configured to be non-movably fixed in the axial direction in the mounted state.

4. The bicycle driving assembly according to claim 1, wherein
   the second sprocket cluster is at least partially located outward of the first sprocket cluster in a mounted state where the bicycle driving assembly is mounted to a bicycle.

5. The bicycle driving assembly according to claim 1, wherein
   the at least one first sprocket includes a plurality of the first sprockets.

6. The bicycle driving assembly according to claim 1, wherein
   the at least one second sprocket includes a plurality of the second sprockets.

7. The bicycle driving assembly according to claim 1, wherein
   the at least one first sprocket has a total tooth number that is greater than a total tooth number of the at least one second sprocket.

8. The bicycle driving assembly according to claim 1, wherein
   one of the first sprocket cluster and the second sprocket cluster is movably disposed relative to the other of the first sprocket cluster and the second sprocket cluster between a non-overlapping position and an overlapping position,
   the at least one second sprocket does not overlap with the first sprocket cluster in a radial direction that is perpendicular to the rotational axis while in the non-overlapping position, and
   the at least one second sprocket overlaps with the first sprocket cluster in the radial direction while in the overlapping position.

9. The bicycle driving assembly according to claim 8, wherein
   the at least one first sprocket includes a first largest sprocket and a first smallest sprocket,
   the at least one second sprocket includes a second largest sprocket and a second smallest sprocket,
   the first largest sprocket is positioned closer to a bicycle frame of a bicycle than the first smallest sprocket in a mounted state where the bicycle driving assembly is mounted to the bicycle,
   the second smallest sprocket is positioned closer to the bicycle frame of the bicycle than the second largest sprocket in the mounted state,
   the first smallest sprocket is positioned closer to the bicycle frame of the bicycle than the second smallest sprocket in a state where the bicycle driving assembly is mounted to the bicycle and the one of the first sprocket cluster and the second sprocket cluster is positioned in the non-overlapping position.

10. The bicycle driving assembly according to claim 1, wherein
    one of the first sprocket cluster and the second sprocket cluster is movably disposed relative to the other of the first sprocket cluster and the second sprocket cluster between a non-overlapping position and an overlapping position,
    the first sprocket cluster defining a second sprocket cluster receiving area,
    the at least one second sprocket being spaced from the second sprocket cluster receiving area while in the non-overlapping position, and
    the at least one second sprocket being disposed inside the second sprocket cluster receiving area while in the overlapping position.

11. The bicycle driving assembly according to claim 10, wherein
    the at least one first sprocket includes a first largest sprocket and a first smallest sprocket,
    the at least one second sprocket includes a second largest sprocket and a second smallest sprocket,
    the first largest sprocket is positioned closer to a bicycle frame of a bicycle than the first smallest sprocket in a mounted state where the bicycle driving assembly is mounted to the bicycle,
    the second smallest sprocket is positioned closer to the bicycle frame of the bicycle than the second largest sprocket in the mounted state,
    the first smallest sprocket is positioned closer to the bicycle frame of the bicycle than the second smallest sprocket in a state where the bicycle driving assembly is mounted to the bicycle and the one of the first sprocket cluster and the second sprocket cluster is positioned in the non-overlapping position.

12. The bicycle driving assembly according to claim 1, wherein
    the first actuator includes a motor having an output shaft operatively coupled to one of the first sprocket cluster and the second sprocket cluster that is movably disposed relative to the other of the first sprocket cluster and the second sprocket cluster.

13. The bicycle driving assembly according to claim 12, further comprising
    a hub axle attached to a bicycle frame of a bicycle, the hub axle supporting at least the motor of the first actuator being disposed coaxially around the hub axle.

14. The bicycle driving assembly according to claim 12, further comprising
    the output shaft has a first thread that is engaged with a second thread of the one of the first sprocket cluster and the second sprocket cluster so that the one of the first sprocket cluster and the second sprocket cluster axially moves by a rotation of the output shaft.

15. The bicycle driving assembly according to claim 14, wherein
    the second thread is provided on the first sprocket cluster.

16. The bicycle driving assembly according to claim 14, wherein
    the second thread is provided on the second sprocket cluster.

17. The bicycle driving assembly according to claim 1, further comprising
    a first controller connected to the first actuator.

18. The bicycle driving assembly according to claim 1, further comprising
    a first power source electrically coupled to the first actuator.

19. The bicycle driving assembly according to claim 17, further comprising
    a first wireless communicator connected to the first controller.

20. A bicycle shifting system comprising:
    the bicycle driving assembly according to claim 1; and
    a chain guide configured to guide a bicycle chain movably coupled to the bicycle driving assembly.

21. The bicycle shifting system according to claim 20, further comprising
    a bicycle rear derailleur including the chain guide.

22. The bicycle shifting system according to claim 21, further comprising
    a shift position detector configured to detect a shift position of the bicycle rear derailleur; and
    a main controller configured to control the first actuator based on the shift position of the bicycle rear derailleur detected by the shift position detector.

23. The bicycle shifting system according to claim 21, wherein
    the bicycle rear derailleur includes a second actuator configured to move the chain guide; and
    a main controller configured to control the first actuator and the second actuator.

* * * * *